United States Patent
Virtanen et al.

(10) Patent No.: US 6,600,131 B2
(45) Date of Patent: Jul. 29, 2003

(54) LASER CUTTING SYSTEM

(75) Inventors: Mikka Virtanen, Helsinki (FI); Frank Heyerick, Deinze (BE); Johannes Ulrich, Furstenfeldbruck (DE); Jorma Taijonlahti, Yliharma (FI)

(73) Assignee: Lillbacka Jetair Oy, Kauhava (FI)

( * ) Notice: Subject to any disclaimer, the term of this patent is extended or adjusted under 35 U.S.C. 154(b) by 0 days.

(21) Appl. No.: 09/907,915

(22) Filed: Jul. 19, 2001

(65) Prior Publication Data

US 2002/0030041 A1 Mar. 14, 2002

Related U.S. Application Data

(62) Division of application No. 09/359,390, filed on Jul. 23, 1999, now Pat. No. 6,284,999.

(51) Int. Cl.[7] ............................... B23K 26/20
(52) U.S. Cl. ................................ 219/121.67
(58) Field of Search ........................ 219/121.78, 121.83, 219/121.82, 121.79, 121.81, 121.72, 121.6, 121.67, 121.85, 121.54, 121.61; 250/201.2, 559.13; 700/159, 166

(56) References Cited

U.S. PATENT DOCUMENTS

| | | | |
|---|---|---|---|
| 3,761,675 A | * | 9/1973 | Mason et al. |
| 3,769,488 A | * | 10/1973 | Hasslinger |
| 4,213,704 A | * | 7/1980 | Burns et al. |
| 4,289,378 A | * | 9/1981 | Remy et al. |
| 4,541,055 A | * | 9/1985 | Wolfe et al. |
| 4,639,572 A | * | 1/1987 | Gruzman et al. |
| 4,833,381 A | * | 5/1989 | Taft et al. |
| 5,006,999 A | * | 4/1991 | Kuno et al. |
| 5,340,962 A | * | 8/1994 | Schmidt et al. |
| 5,399,835 A | * | 3/1995 | Nakata |
| 5,466,909 A | * | 11/1995 | Nihei et al. |
| 5,667,707 A | * | 9/1997 | Klingel et al. |
| 5,670,773 A | * | 9/1997 | Planeix |
| 5,904,867 A | * | 5/1999 | Herke |
| 5,948,288 A | * | 9/1999 | Treves et al. |
| 6,128,546 A | * | 10/2000 | Basista |
| 6,140,606 A | * | 10/2000 | Heikilla et al. |

\* cited by examiner

Primary Examiner—M. Alexandra Elve
Assistant Examiner—Jonathan Johnson
(74) Attorney, Agent, or Firm—Louis Woo

(57) ABSTRACT

A laser cutting system has a specially designed frame that allows the laser cutting head to be mounted to the underside of a cross beam for a more efficient movement. The frame is further designed so as to allow the accessing of the work area of the laser cutting system along three different directions. The movement of the laser cutting head for fabricating a sheet placed in the work area of the laser cutting system is effected by a process that takes into consideration a number of parameters and determined data all of which are interpolated for generating optimal movements to further enhance the operating efficiency of the laser cutting system. The laser resonator of the laser cutting system of the instant invention is configured to have a telescopic system that maintains the density and power of the laser beam by auto focusing the same so that optimum cuts can be effected irrespective of whichever area of the worksheet is to be fabricated. A special design worktable in the working area of the laser cutting system provides support for the worksheet.

18 Claims, 29 Drawing Sheets

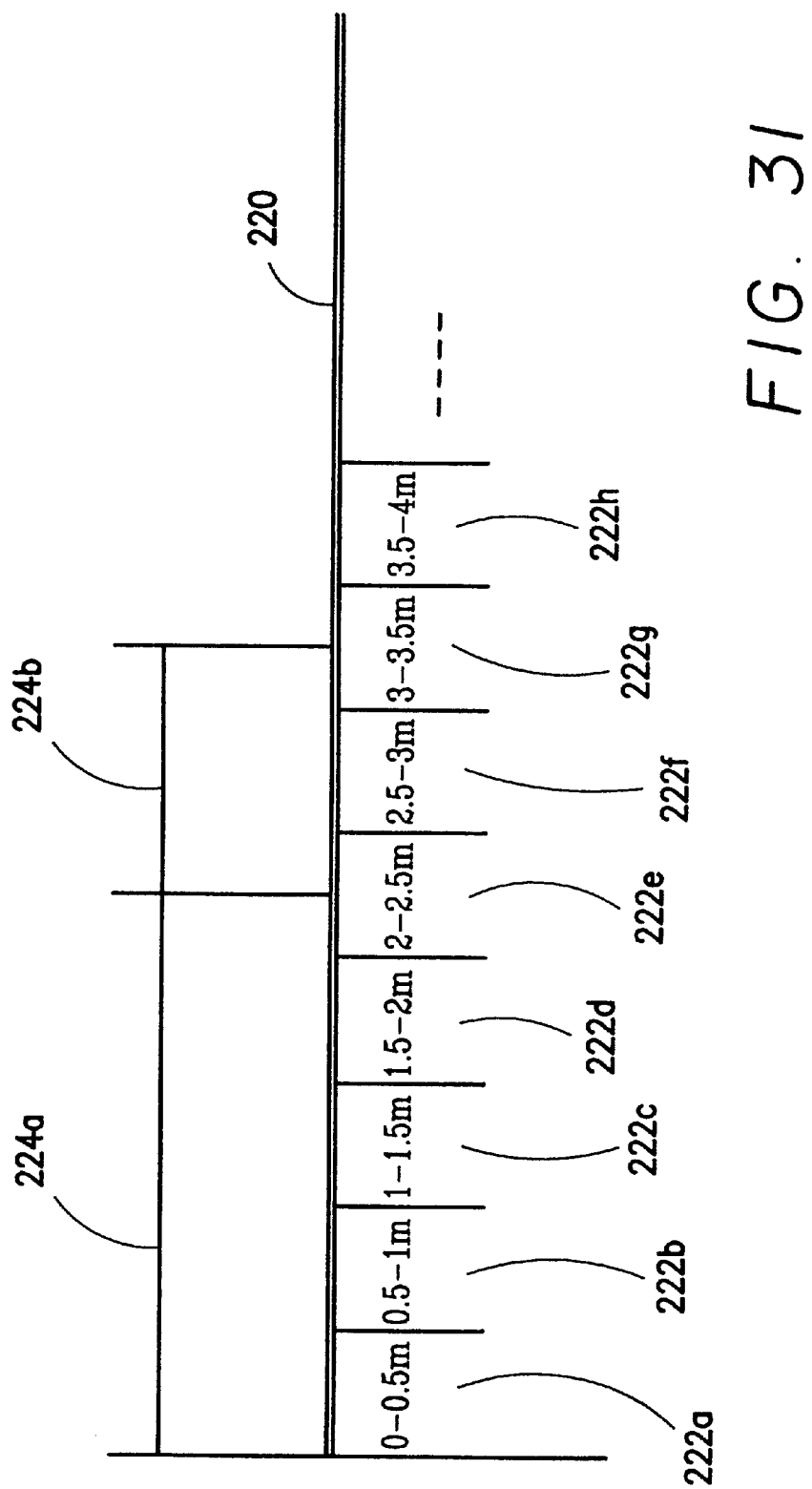

LASER CUTTING SYSTEM

RELATED APPLICATIONS

This application is a divisional of Ser. No. 09/359,390 filed Jul. 23, 1999 now U.S. Pat. No. 6,284,999 and is related to Ser. No. 09/360,518 (since issued as U.S. Pat. No. 6,140,606), Ser. No. 09/359,389, Ser. No. 09/359,392 now U.S. Pat. No. 6,326,586, and Ser. No. 09/360,496, now U.S. Pat. No. 6,300,992, and Ser. No. 09/360,497 now U.S. Pat. No. 6,376,798, all filed on Jul. 23, 1999 and all having the same assignee as the instant invention.

FIELD OF THE INVENTION

The present invention relates to a laser cutting system that has new designs at least with respect to its frame, its laser output mechanism, the process of outputting the laser for fabricating a worksheet, and the worktable system to which the worksheet is placed.

BACKGROUND OF THE INVENTION

Flying optic laser cutting systems are known. However, the prior art systems tend to have a number of shortcomings that limit their speed and efficiency. Some of these shortcomings result from, for example, the design of the frame that supports the cutting head of the laser cutting system, the design of the cutting mechanism itself, the way in which the cutting process is effectuated, the limited way in which a machine may be installed and, once installed, the limited accessing of the machine by the operator.

The laser cutting system of the instant invention aims to improve on every aspect of the aforenoted shortcomings of current laser cutting systems by, specifically, providing a new frame for the system, an improved laser cutting mechanism, and a more efficient process of effecting cutting. In addition, the laser cutting system of the instant invention is provisioned with a worktable system that enhances the cutting of a worksheet placed thereon, as well as for evacuating any dust and/or exhaust gases resulting from the fabricating of the worksheet efficiently away from the laser cutting system.

SUMMARY OF THE INVENTION

The present invention laser cutting system is built on a frame that has a cross beam supported by two structures. The cross beam is designed to have a trapezoidal structure for movably supporting a laser cutting head that hangs therefrom. The laser cutting head in turn is mounted to a base member that has arms extending in a direction perpendicular to the longitudinal axis of the cross beam. As a consequence, the cutting head can move along the longitudinal axis of the cross beam as well as the longitudinal direction along the axis of the arms extending from the base member. To effect the movement of the base member bidirectionally along the longitudinal axis of the cross beam, a linear drive mechanism, in the form for example of a magnet drive, may be used. A linear drive may also be used for moving the cutting head along the direction of the extending arms of the base members. For the movement of the cutting head along the vertical direction, a servomotor is mounted to the base member, or more specifically the skeleton frame of the base member to which the cutting head is mounted, so that the cutting head can be moved in a direction perpendicular to the respective longitudinal axes of the cross beam and the extending arms.

The cross beam of the frame of the laser cutting system is supported, at both ends, by respective support structures, which may be unitary structures. One the structures is configured to have a bore through which exhaust gases and/or dust particles resulting from the fabricating of a worksheet by the laser beam output from the cutting head may be vented away from the laser cutting system. The other of the support structures is configured to have an opening through which worksheets may be conveyed to or removed from a support table, such as for example a worktable or a cassette placed underneath the cross beam. The worksheets may also be conveyed to/from the laser cutting system from either side of the cross beam in a direction perpendicular to the longitudinal axis of the cross beam. To provide further rigidity for the frame of the laser cutting system, two truss members connect the support structures at their respective bases.

To control the movement of the laser cutting head, a processor means, such as for example a computerized numerical controller (CNC), is provided in a housing positioned relative to the frame. The CNC, in addition to controlling the respective movements of the various drive motors that move the cutting head along the various directions, also controls the outputting of the laser beam to the cutting head by the laser generator, which is also positioned adjacent and/or relative to the frame.

For the laser cutting system of the instant invention, the laser beam output from the laser beam generator, or resonator, is reflected by a number of mirrors with the focal point of the laser beam for fabricating the particular material of the worksheet to be focused by a motor mechanism internal to the cutting head. To maintain the distance related to the widening or focusing of the axial symmetric laser beam, the laser generator of the inventive laser cutting system has a telescope mechanism, positioned within the laser generator itself, that works cooperatively with the output coupler of the laser resonator for maintaining the density and the power of the laser beam to constant values for a predetermined distance, so that the power of the laser beam requisite for effectively fabricating the worksheet is maintained for every portion of the worksheet. The telescope mechanism has two mirrors. One is the output coupler from the laser resonator. The other is the lens that moves relative to the output coupler. The lens is driven relative to the coupler by a motor, which is controlled by software of the system according to some preset parameters. These parameters include, among other things, the distance separating the lens from the sheet material, i.e. the focusing lens distance.

Such auto-focusing of the laser beam is done automatically by a cognizance of a predetermined distance that the laser beam is to be output, the type of material being fabricated, and the type of telescopic mechanism to be used. Moreover, by taking into consideration the actual length of the laser beam and by dividing the maximum useable length of the laser beam into a number of zones, i.e., different quadrants or sectors, the focal point of the laser beam may be corrected. The focus of the laser beam for the different areas of the worksheet may be adjusted by moving the laser cutting head bidirectionally along its vertical axis to maintain respective optimal focal points for worksheets of different materials.

To compensate for the deficiencies inherent in the different areas of the worksheet which may be due to their respective locations with reference to the center of the worksheet, the worktable or cassette onto which the worksheet is placed has its areas divided into a number of portions each with correction factors determined empirically, so that such correction factors may be taken into account when a particular location of the worksheet which corresponds to the location on the worktable to which that portion of the worksheet superposes is to be fabricated by the laser beam output from the cutting head. These correction factors are stored in a memory that may be part of the CNC controller.

With respect to the way in which the laser beam output from the laser generator is to be directed, a number of reflective mirrors are used. To enhance the alignment process, unlike the prior art systems that require extensive removal and reassembly of the various mirrors for alignment of the laser beam, the reflective mirrors of the instant invention laser cutting system are configured such that alignment can easily be effected by the removal of a single one of the mirrors. Further, the reassembly of the mirror into the system does not require any further realignment of the laser beam. This is done by configuring the opening of the mirror holder to have a dimension large enough to allow the removal of the mirror while leaving the mirror holder fixed to the support of the device and allowing the laser beam to freely pass.

The laser cutting head being used with the laser cutting system of the instant invention, but for a number of modifications, could be any cutting head that is sold by a number of manufacturers. One of the improvements of the cutting head of the instant invention is the provision of a servomechanism, via feedback, for automatically adjusting the focus lens inside the cutting head so as to enable the automatic adjustment of the focus point for different types of materials that may be fabricated by the laser beam output from the cutting head. Another improvement of the cutting head of the instant invention is the provision of a partition window somewhere within the cutting head for isolating the focusing lens from particles that may ricochet against the focusing lens when the worksheet is being pierced or cut by the laser beam. This is particularly true when the laser process is not stable or when the parameters for cutting are not set properly. Such partition means may be in the form of a diamond window that has the properties of being translucent so as to allow the laser beam to pass therethrough as well as having the hardness for withstanding the impacts of the ricocheting particles. Other partition windows that have the same qualities as a diamond window may also be used.

To enhance the fabrication of a worksheet, the movement of the cutting head and the directing of the laser beam thereto are controlled by the CNC in a process that takes into consideration the distance separating a location on the worksheet for which work is being done to a next location on the worksheet to which the next piercing by the worksheet is to be effected. To effect the optimal movement of the cutting head from one location to the next, variables such as acceleration and deceleration of the cutting head, the height of the cutting head with respect to the cutting sheet, or the focal point for the material to which the worksheet is made of, are taken into consideration. The movement of the cutting head relative to the worksheet may be termed a "ping pong" effect in that the cutting head moves in an optimal manner from point to point for piercing various holes and cuts on the worksheet.

The worktable onto which the worksheet is placed is made up of a frame, in the shape of a cassette, that is movable in directions perpendicular to the longitudinal axis of the cross beam. The movement of the cassette is effected on a couple of rails, or guides, onto which the cassette rides. Within the cassette there are a number of strips, each having a number of bores formed therealong extending along the length of the cassette. A number of brackets extend in a direction perpendicular to the strips at predetermined positions along the cassette. These brackets each have a number of equally spaced slots formed therealong. A plurality of ribs are fitted to equally distanced slots of the brackets so that the ribs and the strips that have the bores are alternated throughout the cassette along its longitudinal direction. The ribs each are formed with a number of contiguous teeth at its top portion. Into each bore of each strip a pin is inserted. The plane that is formed by the tips of the pin is higher, although not by much, than the plane that is formed by the tip of the contiguous teeth of the ribs. Thus, it is the tip of the pins that support the worksheet on the cassette. If the worksheet flexes, or when the worksheet is being cut, the tips of the contiguous teeth of the ribs would provide support for those portions of the worksheet that fall below the plane formed by the tips of the pins.

By being able to roll along the rails, the cassette is movable between a location under the cross beam for the fabrication of a worksheet placed thereon, and a location that is away from the frame of the laser cutting system, so that the finished worksheet may be removed, and be replaced by a to be fabricated worksheet.

The cassette is placed over a suction frame structure that has a number of sections each adaptable to provide vacuum to a corresponding portion of the cassette. Thus, by activating the particular section of the suction base, particles resulting from the fabrication of the worksheet by the laser beam are suctioned away and vented through the bore at one of the support structures of the frame away from the laser cutting system.

It is therefore an objective of the present invention to have a frame designed for providing a more efficient way of mounting a cutting head for a laser cutting system.

It is another objective of the present invention to provide a laser cutting system that has an improved laser resonator having means that can provide auto-focusing.

It is yet another objective of the present invention to provide an improved cutting head for a laser cutting system that does not require its focusing lens to be replaced as often as those in conventional laser cutting heads.

It is still another objective of the present invention laser cutting system to provide a process of more efficiently moving the cutting head.

It is still yet another objective of the present invention to provide a worktable that enhances the fabrication of a worksheet placed thereon by a laser beam.

It is therefore an overall objective of the present invention to provide a flying optic laser system that operates in a way that is more efficient than prior art laser cutting systems.

BRIEF DESCRIPTION OF THE DRAWINGS

The above mentioned objectives and advantages of the present invention will become apparent and the invention itself will be best understood by reference to the following description of an embodiment of the invention taken in conjunction with the accompanying drawings, wherein:

FIG. 31 is an illustration of the auto-focusing feature of the instant invention system.

DESCRIPTION OF THE PREFERRED EMBODIMENTS

Figure 1:
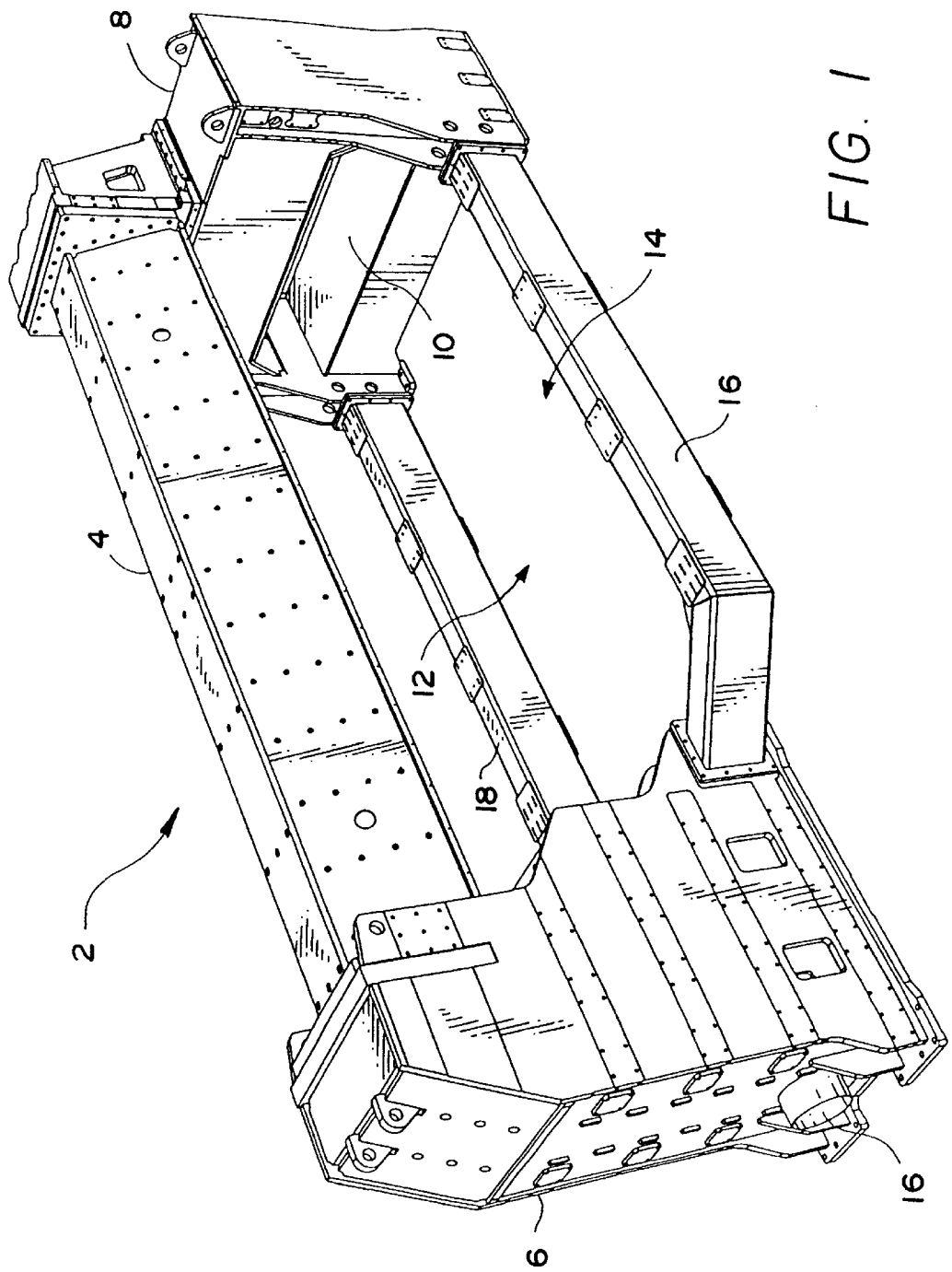
FIG. 1 is a perspective view of the frame structure of the laser cutting system of the instant invention.
Figure 2:
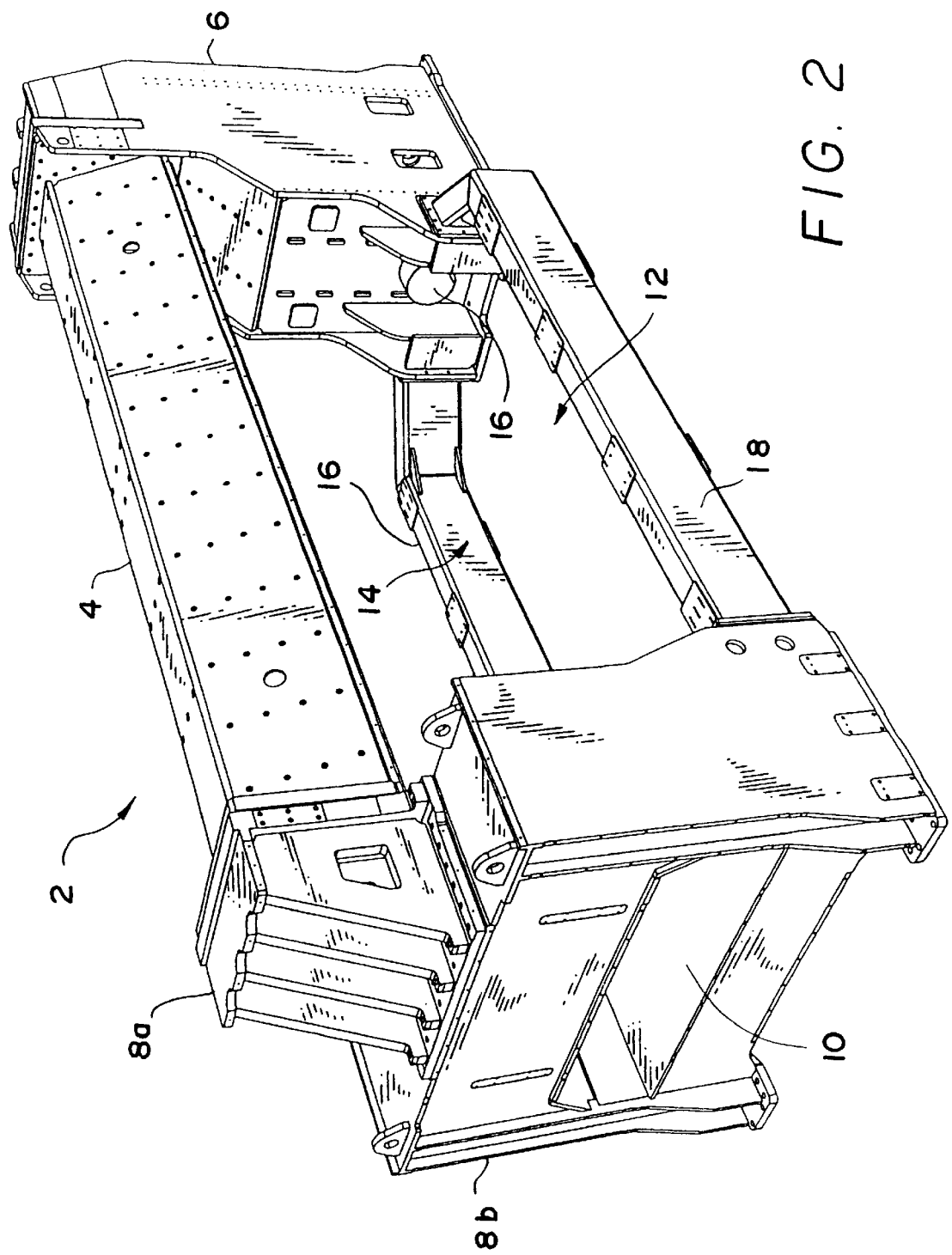
FIG. 2 is a second perspective view of the frame structure of the laser cutting system of the instant invention.

With reference to FIG. 1, a frame structure of the laser cutting system of the instant invention is shown. This frame structure 2 has a cross beam 4 being supported by two support structures 6 and 8. Support structure 8, as best shown in FIG. 2, comprises two parts, namely an upper portion 8a resting on a base portion 8b. It should be noted, however, that upper portion 8a and base portion 8b may actually be formed as a unitary structure. Or for that matter, upper portion 8a may actually be an extension of cross section 4. Be that as it may, base portion 8b of support structure 8 has an opening 10 through which access can be gained to the area of the frame underneath cross beam 4 and between support structures 6 and 8. This area may simply be referred to as the work or working area. As further shown in FIGS. 1 and 2, the working area can also be accessed from either side of cross beam 4, such as for example via directional arrows 12 and 14. To provide exhaust venting (which will be discussed in detail later) a bore 16 is provided in support structure 6.

With respect to cross beam 4, note that it has been designed in the form of a trapezoid, with the base being wider than the top. See FIGS. 12 and 13. The inventors have found that such trapezoidal design provides an efficient support of the cutting head of the present invention laser cutting system. To provide additional rigidity to frame 2, two truss support beams 16 and 18 fixedly couple support structures 6 and 8 at their respective bases.

Figure 3:
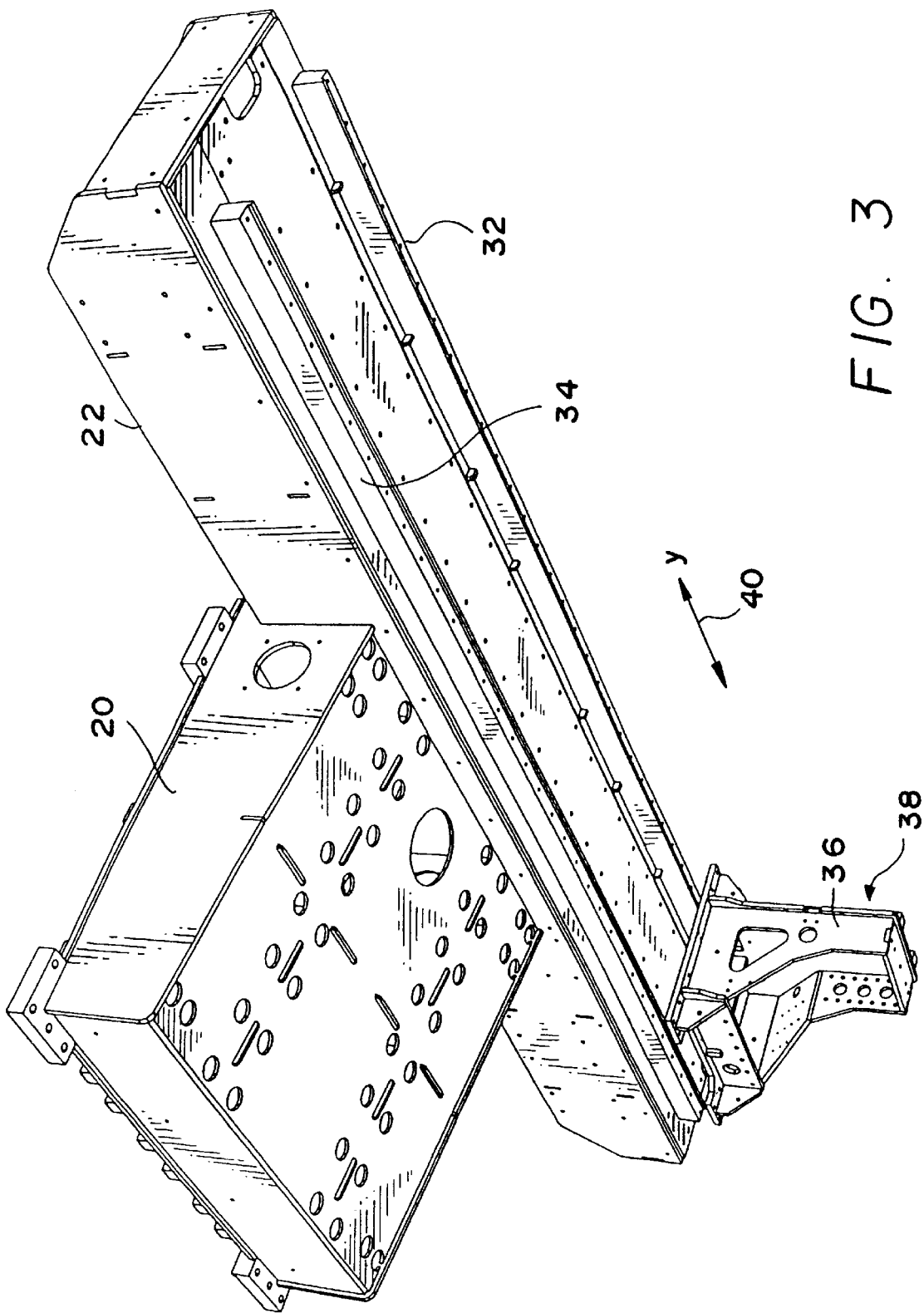
FIG. 3 is a perspective view of the base member that is to be mounted to the cross beam of the FIGS. 1 and 2 frame structure.
Figure 4:
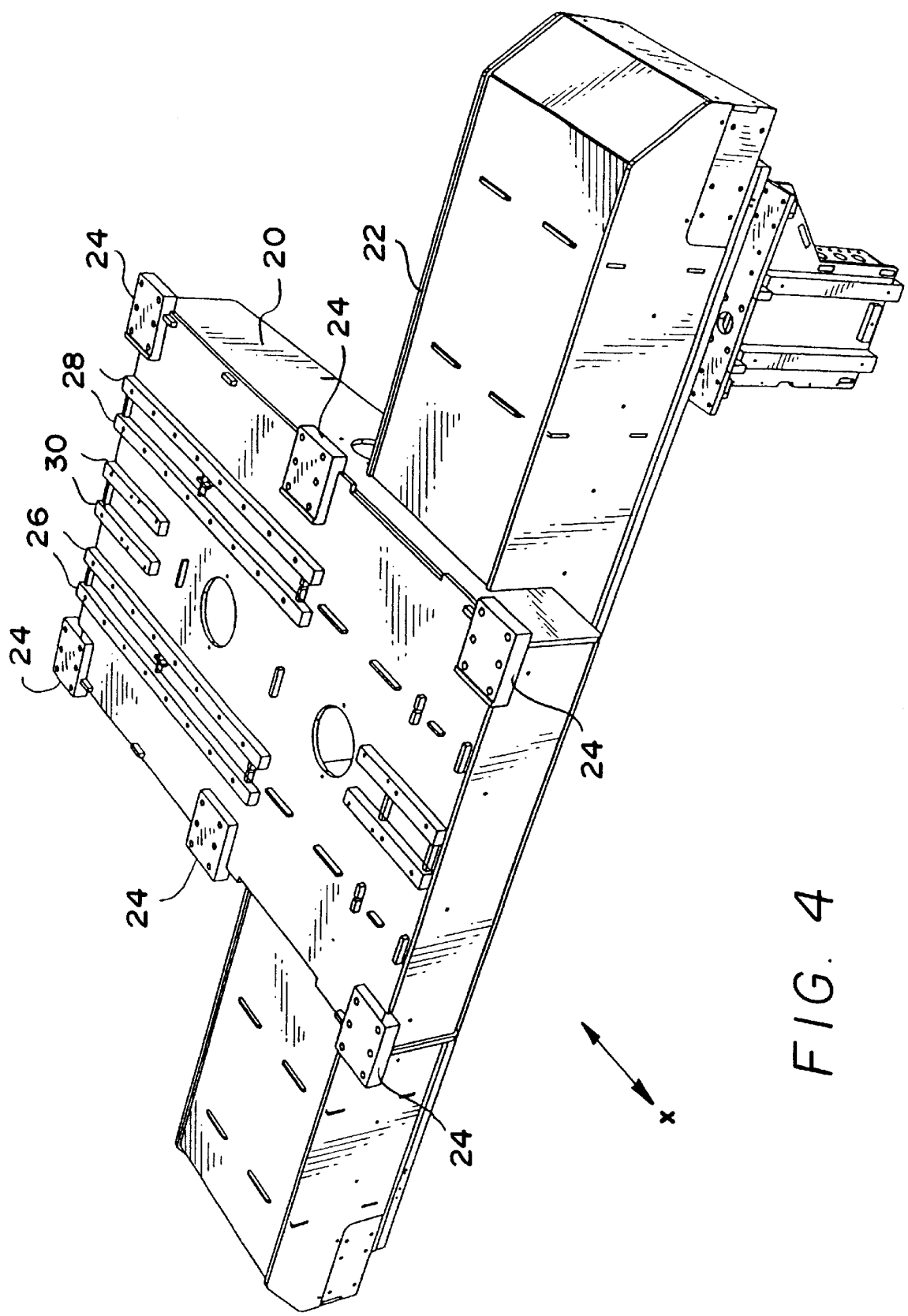
FIG. 4 is a perspective top view of the FIG. 3 base member.

A frame for supporting a worksheet processing apparatus such as for example a laser cutting head is shown in FIGS. 3 and 4. In particular, a base member 20 has fixedly mated thereto an arm 22 that has equal portions extending from either side of base member 20. As best shown in the top perspective view of FIG. 4, base member 20 has bolted to its top, which is the portion that is to be movably coupled to the underside of cross beam 4, a number of mounts 24 that are to be coupled to the bearings of a linear guide, to be discussed laser. Also coupled to the top of base member 24 are two sets of support members 26 and 28 to which respective drive motors in the form of magnetic drives manufactured for example by the Siemens or Krauss Maffei Companies, are mounted. The magnetic drives may also be referred to as linear drives. Two center support members 30 coupled to the top of base member 20 provide mounting support for a linear scale that measures the distance traversed by base member 20 with reference to the longitudinal axis of cross beam 4. More on that later.

The underside of arm 22 is best shown in FIG. 3. As illustrated, there are two guiding rails 32 and 34 extending substantially the entire length of arm 22. Movably mounted to guide rails 32 and 34 is a laser cutting head support frame 36 that has a front portion, designated 38, that is configured to accept a conventional cutting head made by a number of manufacturers including such as for example the Precitec Company of Germany. The movement of frame 36, and therefore the laser cutting head mounted thereto, may be effected by a linear drive motor such as for example the aforenoted magnetic drives or some other equivalent motor so that cutting head support frame 36 is movable bidirectionally, per indicated by bidirectional arrows 40.

Figure 5:
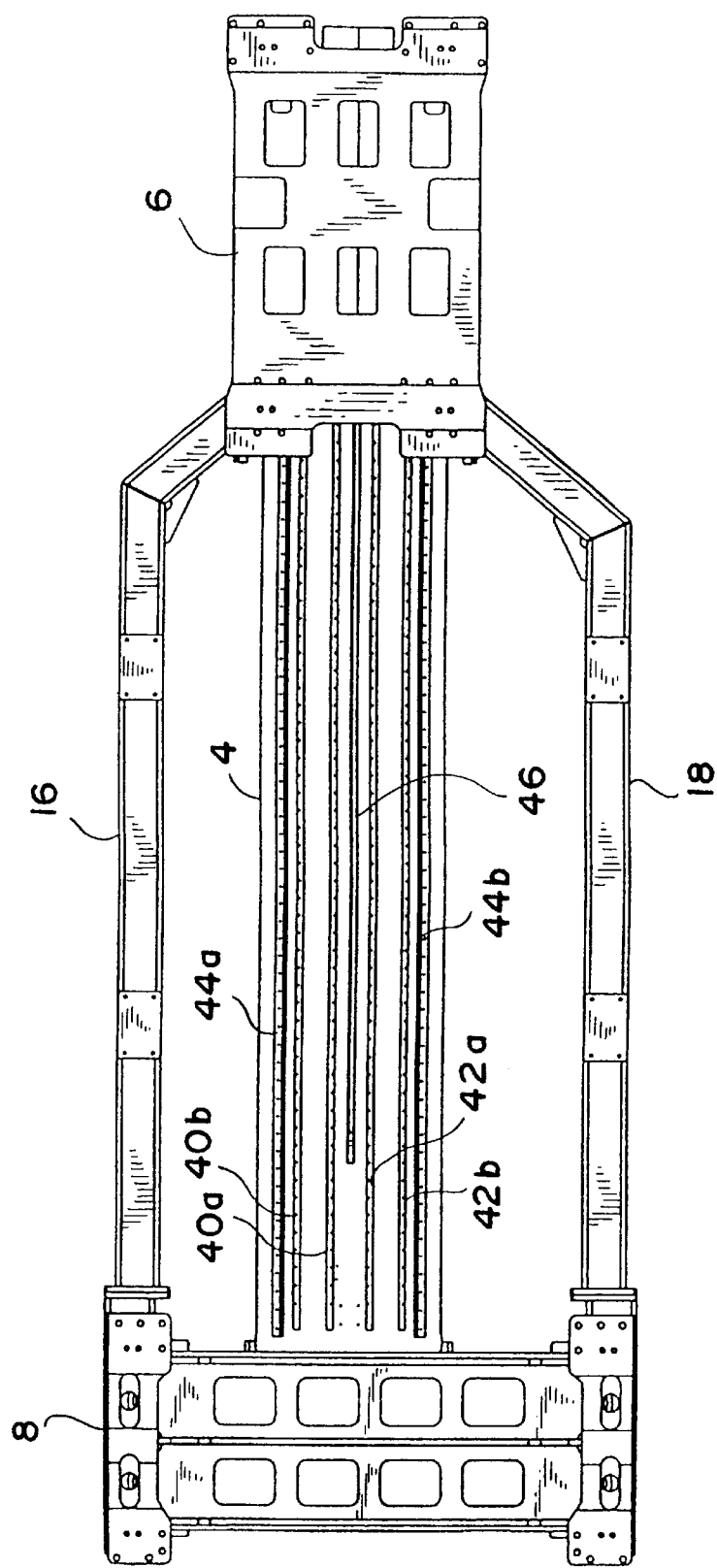
FIG. 5 is a bottom view of the frame structure of FIG. 2.

As noted with respect to the discussion of base member 20 in FIG. 4, there are two coil sliders of the linear drive motor that are coupled to support members 26 and 28. These coil sliders, which may be simply referred to as the linear motor or magnetic drives, would move between magnets 40a, 40b and 42a and 42b, when base member 20 is movably coupled to the underside of cross beam 4. See the bottom view of frame 2 in FIG. 5. Further shown to be coupled to the underside of cross beam 4 are linear guides 44a and 44b, which work cooperatively with mounts 24 of base member 20.

In addition, a linear scale 46 that extends substantially along the entire length of the underside of cross beam 4 works cooperatively with the scale mounted to support members 30 of base member 20 to provide an indication of where along the longitudinal axis of cross beam 4 the base member is at any moment. Such linear scale is manufactured by the Heidenhain company of Germany. For our discussion, the movement of base member 20 along the longitudinal axis of cross beam 4 is deemed to be along the x direction. Similarly, the bidirectional movements of cutting head frame 36 along the longitudinal axis of arm 22 mounted to base member 20 are deemed to be movements along the y direction. The same linear drive that may be purchased from either the Siemens or the Krauss Maffei Companies of Germany could be used for both the x and the y movements of base member 20 along cross beam 4, and frame support 36 along the length of arm 22, respectively.

Figure 6:
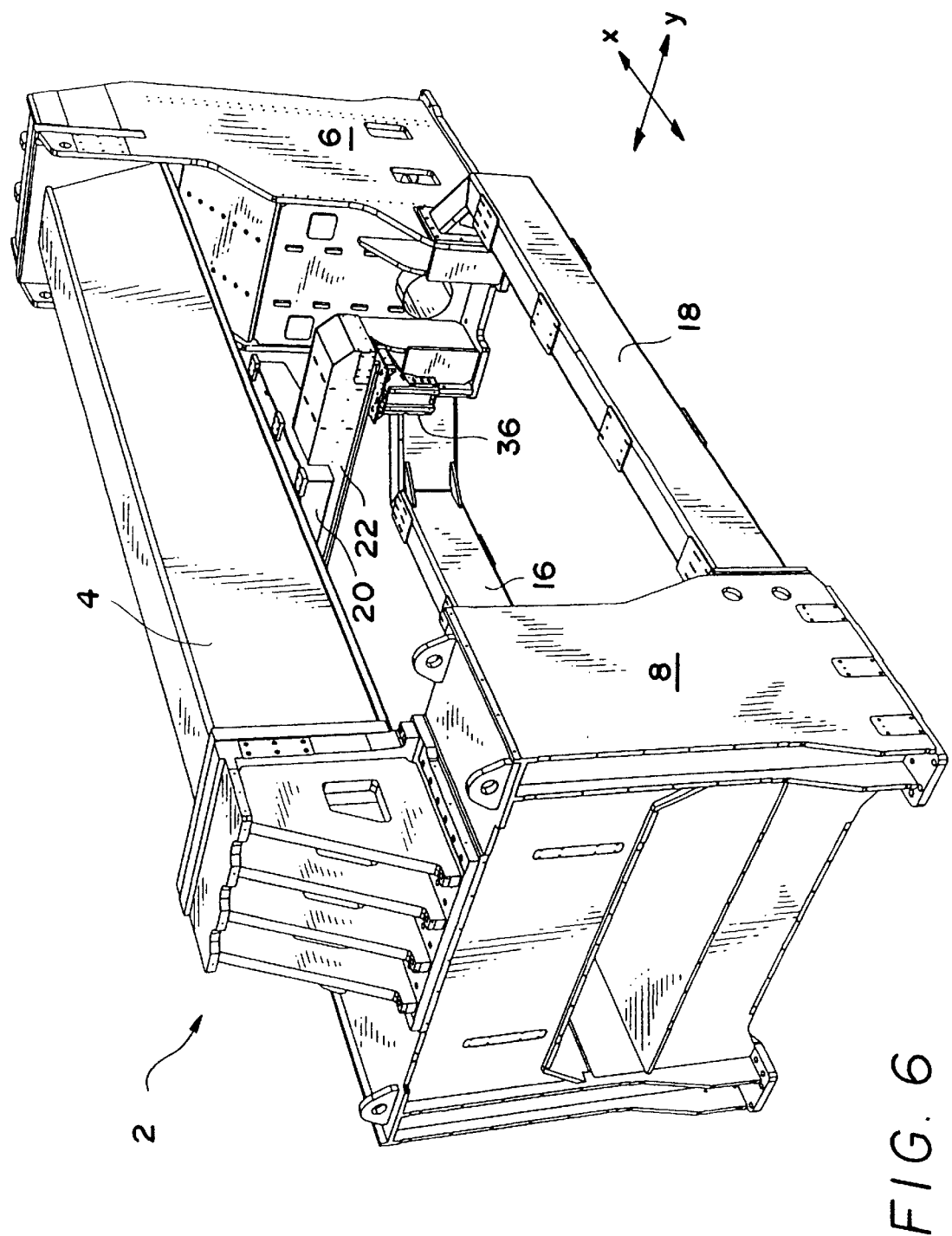
FIG. 6 is a perspective view of the frame structure of FIGS. 1 and 2 having mounted thereto the base member of FIG. 3.
Figure 7:
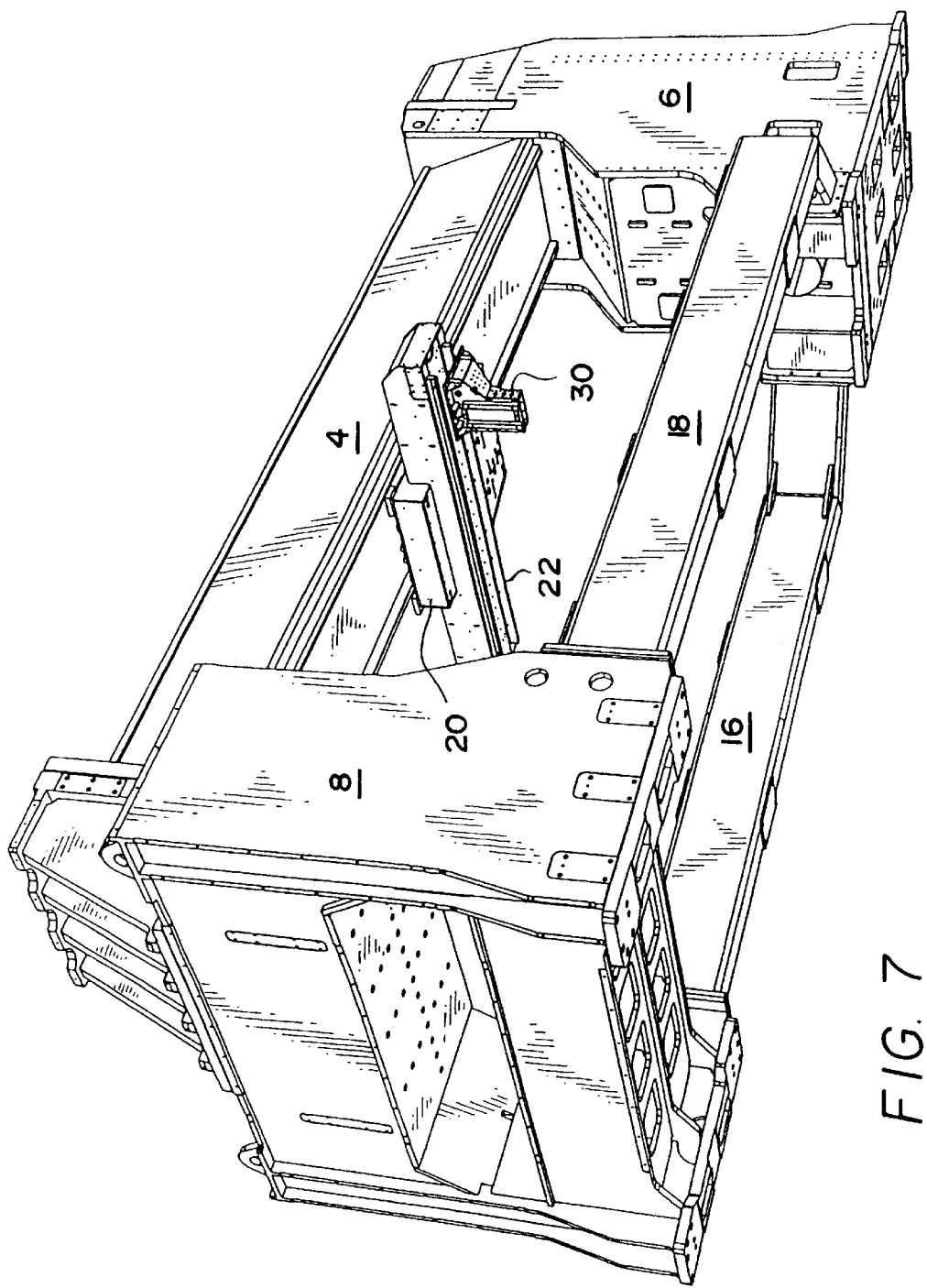
FIG. 7 is a perspective view of the FIG. 5 frame structure illustrating the underside of the cross beam and the support structures of the FIGS. 1 and 2 frame structure.

FIG. 6 illustrates perspectively base member 20 being mounted to the underside of cross beam 4 of frame 2. FIG. 7 is yet another perspective view of base member 20 being movably mounted to the underside of cross beam 4 and is therefore movable along the x direction, as indicated in FIG. 6. Frame 36 to which the laser cutting head is being mounted likewise is movable along the y direction so that by controlling the respective movements of base member 20 along cross beam 4 and frame member 36 along arm 22, the laser cutting head mounted to frame 36 can be moved to any portion of the area underneath cross beam 4 defined between support structures 6 and 8.

Figure 8:
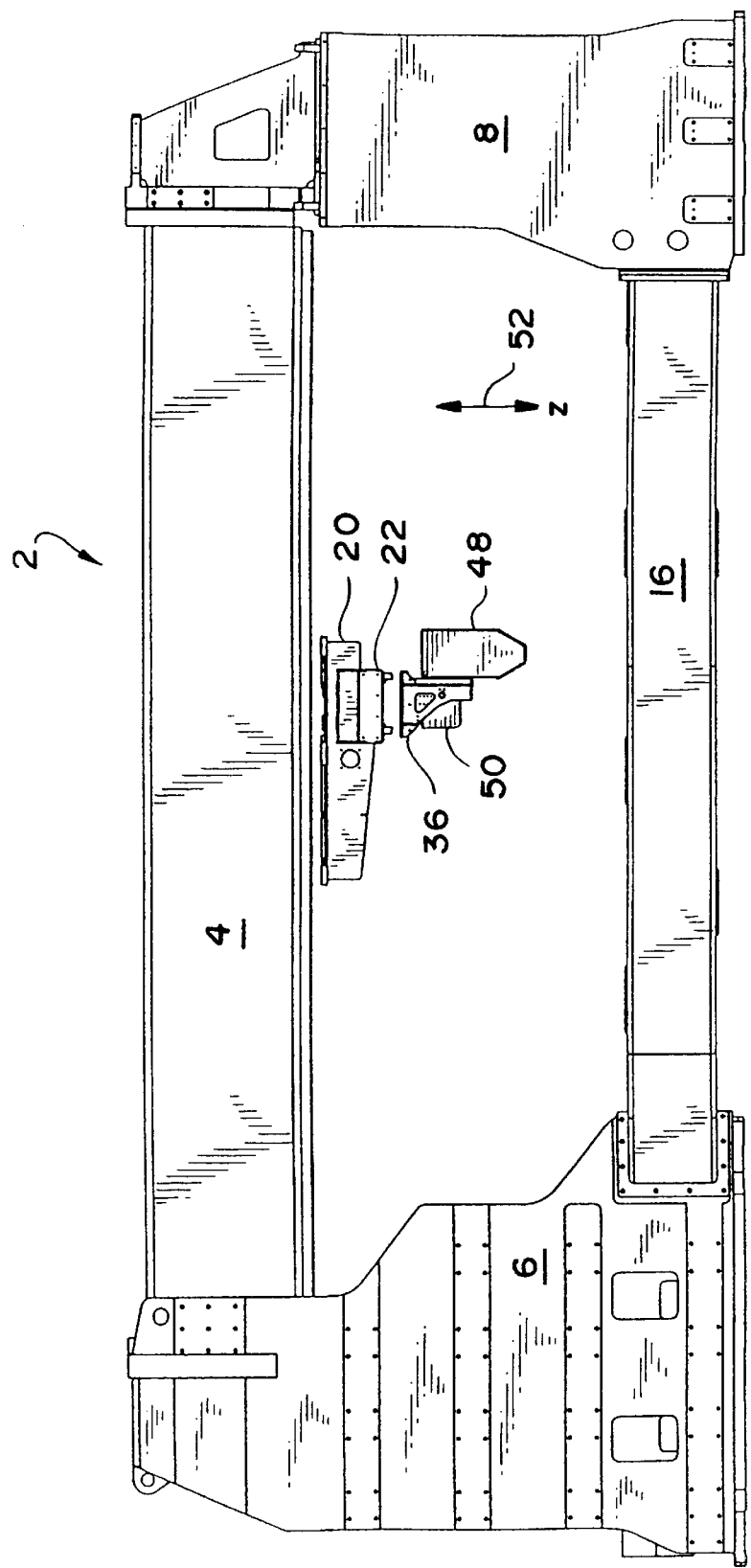
FIG. 8 is a cross sectional view of the FIG. 1 frame structure with the base member of FIG. 3 shown in relationship to the cross beam.

FIG. 8 is a cross-sectional view of the frame structure 2 of the instant invention. In addition, it shows base member 20 being disassembledly associated relative to the underside of cross beam 4. Frame 36 is further shown being disassociated from arm 22. For the purpose of illustrating the relationship between frame 36 and the laser cutting head, note that laser cutting head 48 is movably mounted to the front of frame member 36, while a servomotor 50 that drives cutting head 48 along the direction as indicated by directional arrows 52, i.e., the z axis, is shown to be mounted to the back of frame member 36.

Figure 9:
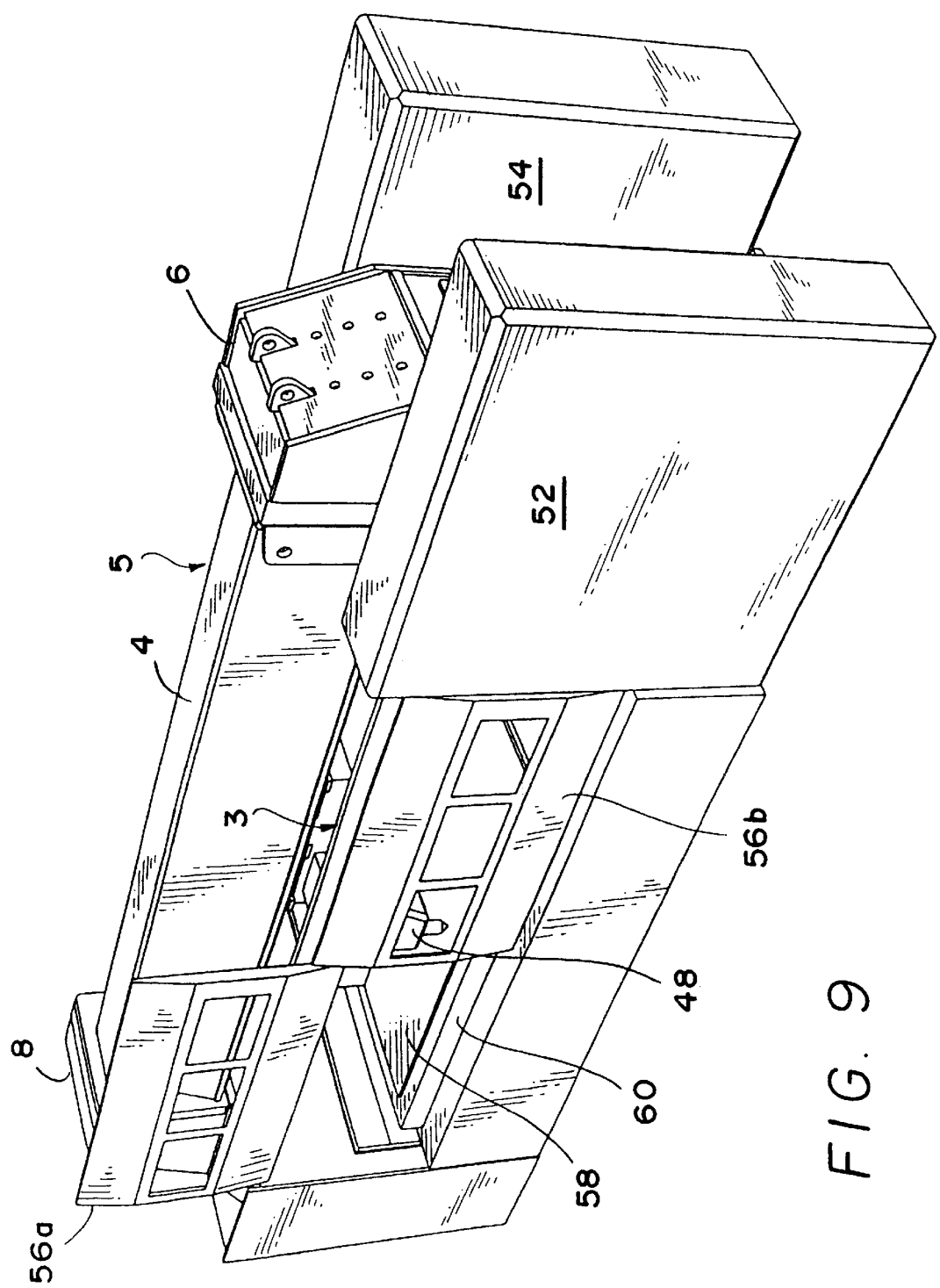
FIG. 9 is a perspective view of the frame structure of FIG. 1 covered by the appropriate doors and having attached thereto the cabinet housings for the laser resonator and the processor controlling unit.
Figure 10:
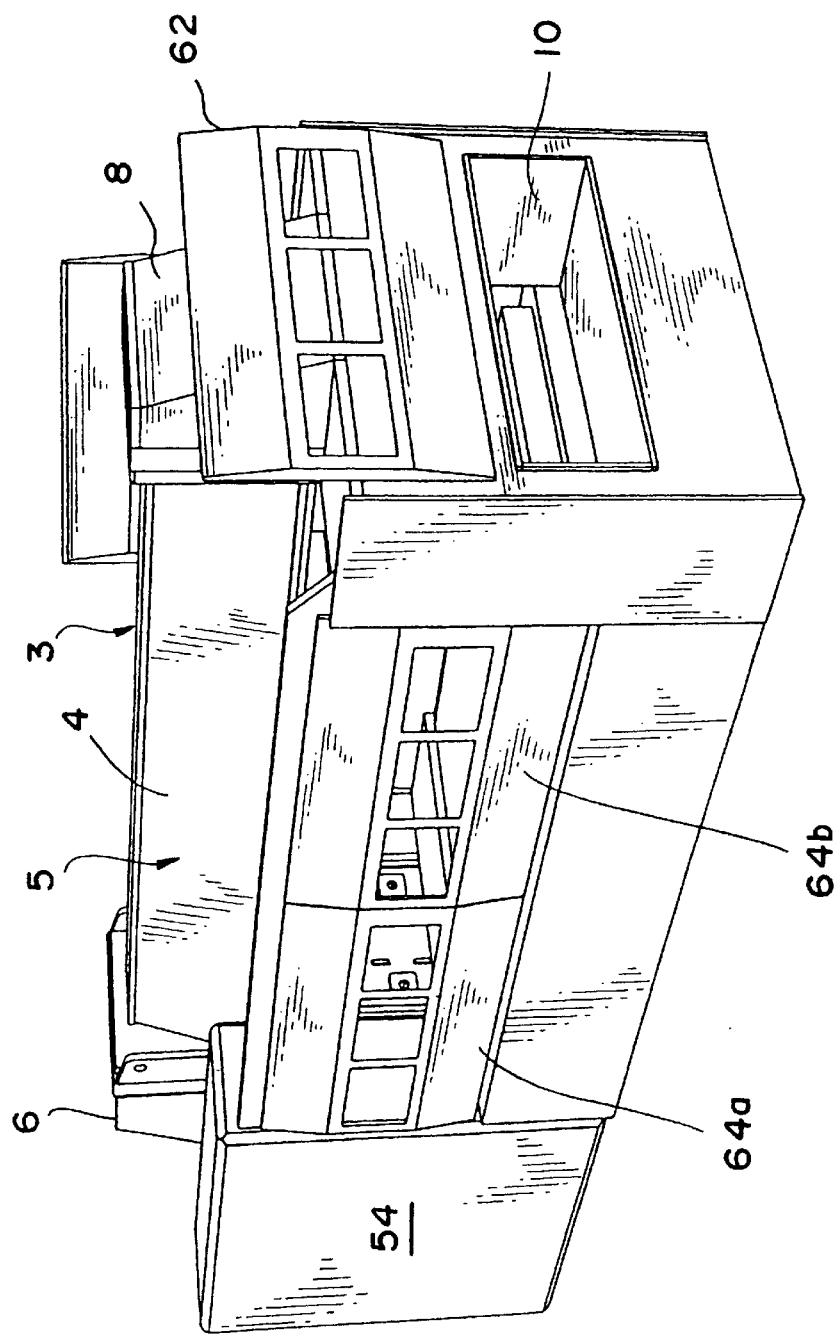
FIG. 10 is another perspective view of the FIG. 9 frame structure showing the opening at one of the support structures.
Figure 11:
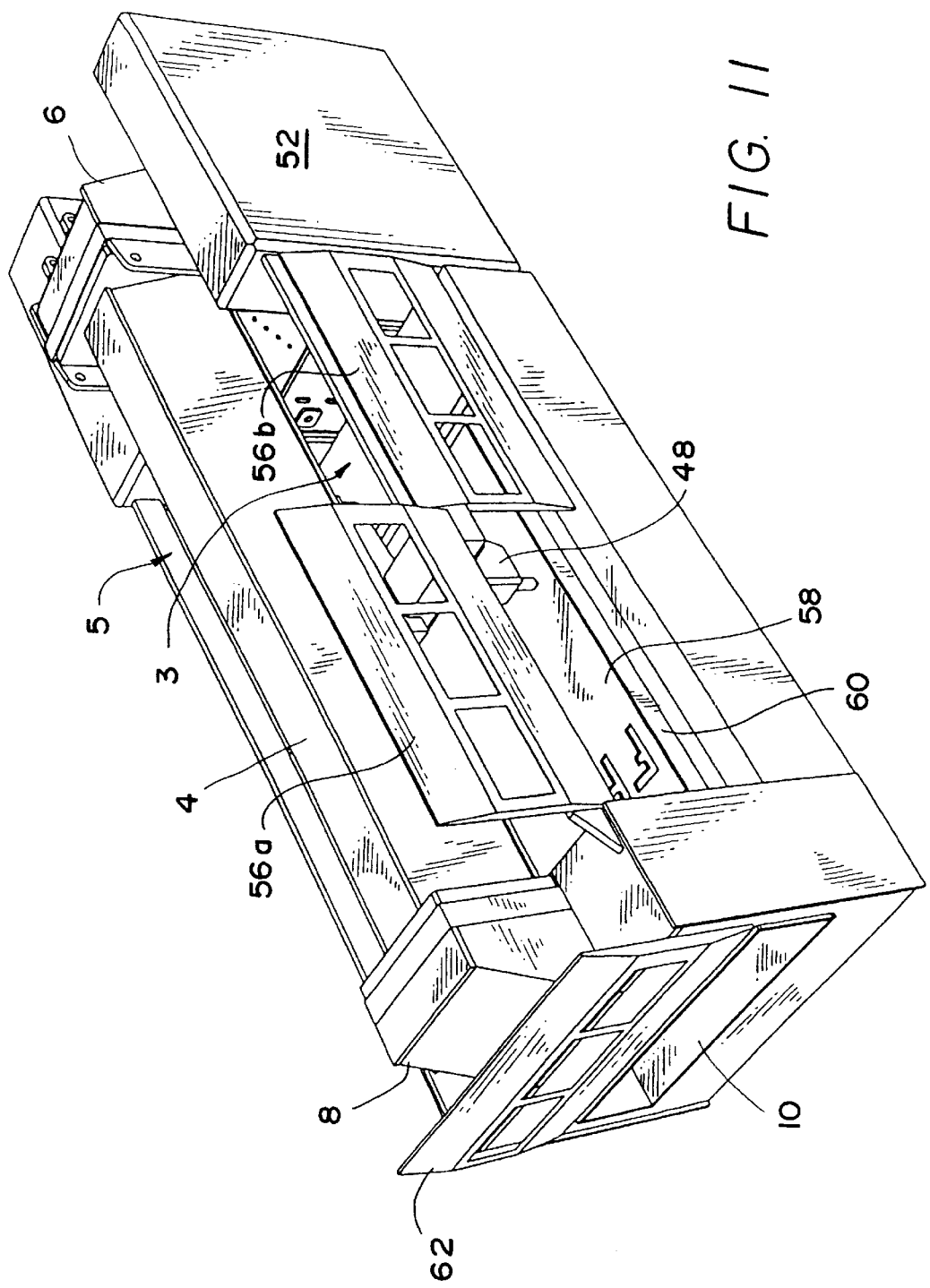
FIG. 11 is yet another perspective view of the laser cutting system of FIG. 10 showing access to the work area of the system by means of the opening at one of the support structures and also at one side of the laser cutting system.

FIGS. 9, 10 and 11, in combination, show the three openings, once the laser cutting system has been equipped with the appropriate covering and doors, that could be used to gain access to the work area of the laser cutting system defined between the two support structures 6 and 8. In particular, as shown in each of FIGS. 9, 10 and 11, a cabinet or housing 52 is provided adjacent to support structure 6. Housing 52 may be used to contain the electrical components such as for example the CNC processing unit that controls the respective operations of the laser cutting system. Also provided adjacent to support structure 6 is another cabinet or housing 54 that houses the laser beam resonator or generator of the system. The generation of the laser beam, and its path in relation to frame 2, will be discussed later. For the time being, it suffices to note that FIGS. 9 and 11 show two doors 56a and 56b that are adaptable to be opened so as to allow the accessing of a workpiece or worksheet 58 placed on top of a worktable, or cassette, 60 within the work area defined between support structures 6 and 8.

FIG. 10, on the other hand, illustrates the fact that the inside of the work area defined between support structures 6 and 8 may be accessed through opening 10 by raising a door 62. This is useful for those instances where perhaps a conveyor may be provided at opening 10 to convey worksheet 58 into and/or out of the working area of laser cutting system 2. FIG. 10 moreover shows two additional doors 64a and 64b movably fitted to the other side of cross beam 4 and adaptable to be opened so as to allow access to the working area of the laser cutting system. Note that doors 56a, 56b and 64a, 64b may each be replaced by respective single doors 56 and 64. Also, a relatively smaller maintenance door, not shown, may be provided at either side of the system of the instant invention.

In sum, frame 2 of the laser cutting system is designed such that it enables the accessing of its working area from three directions, each independent of the other. This allows a more efficient utilization of space by the user, insofar as the laser cutting system may be placed at such a location that gaining access to the working area of the system that otherwise would have posed a problem by other laser cutting systems could easily be done with the laser cutting system of the instant invention.

Given the configuration of the frame of the instant invention, when doors 62, 56a, 56b and 64a, 64b are closed, as per required during the operation of the laser system, passages that allow air to flow into the interior of the system per paths indicated by arrows 3 and 5 are established. Thus, air from the environment are sucked into the interior of the system for replacing the air that is sucked out by the vacuum created in the work table or cassette, the details of which will be discussed with respect to FIGS. 28 and 29, infra.

Figure 12:
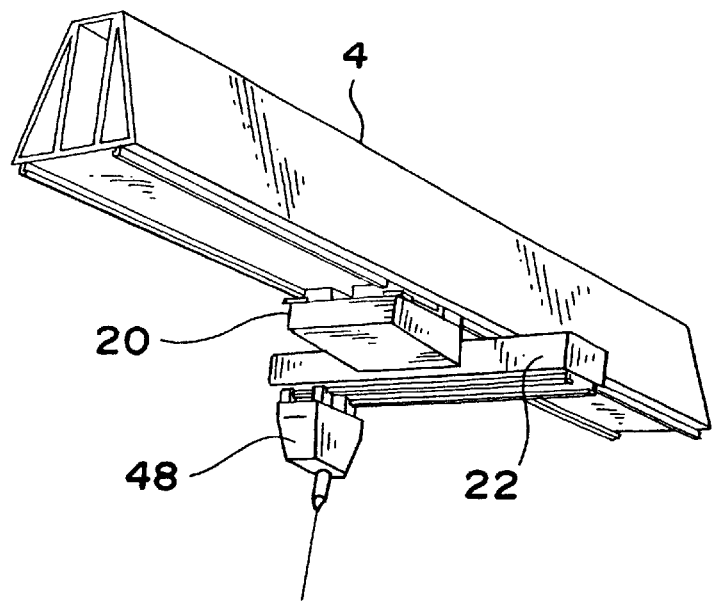
FIG. 12 is a perspective sectional view of the cross beam and the base member that is movably mounted to the cross beam.
Figure 13:
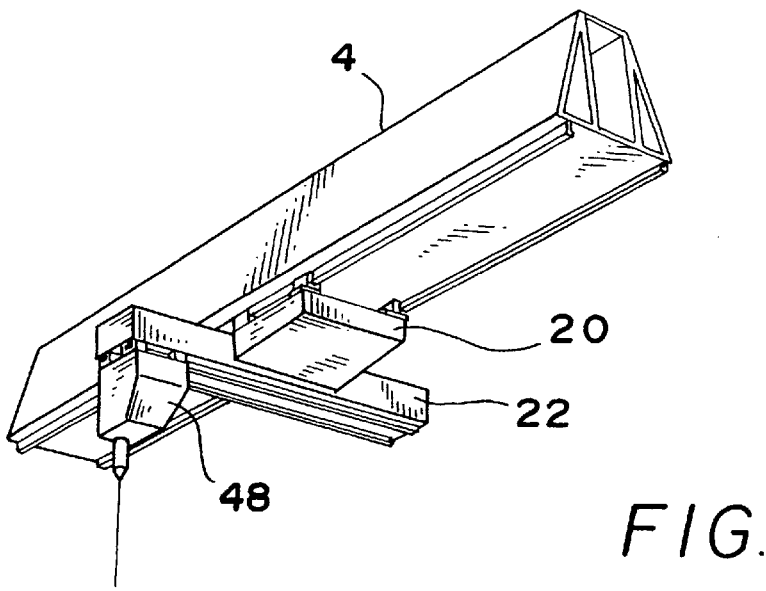
FIG. 13 is another perspective view of the cross beam and the base member, as viewed from another end of the cross beam.

FIGS. 12 and 13 are respective perspective views of the trapezoidal cross beam 4 and the mounting thereto at its underside of base member 20, and the mounting to arm 22 of base member 20 by laser cutting head 48. FIGS. 12 and 13 in essence illustrate that with the particular designs of cross beam 4, base member 20 and arm 22, a most efficient system that enables a fast positioning of cutting head 48 is achieved. This design is quite different from the conventional "gantry" type systems whereby the laser cutting head is mounted to a cross beam mounted to support members, which are movable relative to the worktable.

Further with respect to cross beam 4, insofar as it has an upside down trapezoidal cross section, it is found that both of its sides and its underside are enveloped by the air that is being sucked into the interior of the system via paths 3 and 5. Accordingly, the sucked in air provides an air shield around the linear drives, and any covering thereof, mounted to the underside of cross beam 4 and arm 4 to thereby protect those linear drives or the covering to those drives from being hit by the debris or particles that result from the fabrication of the worksheet. Additionally, the sucked in air could dislodge dirt that might otherwise accumulate at the drives and their covers.

Figure 14:
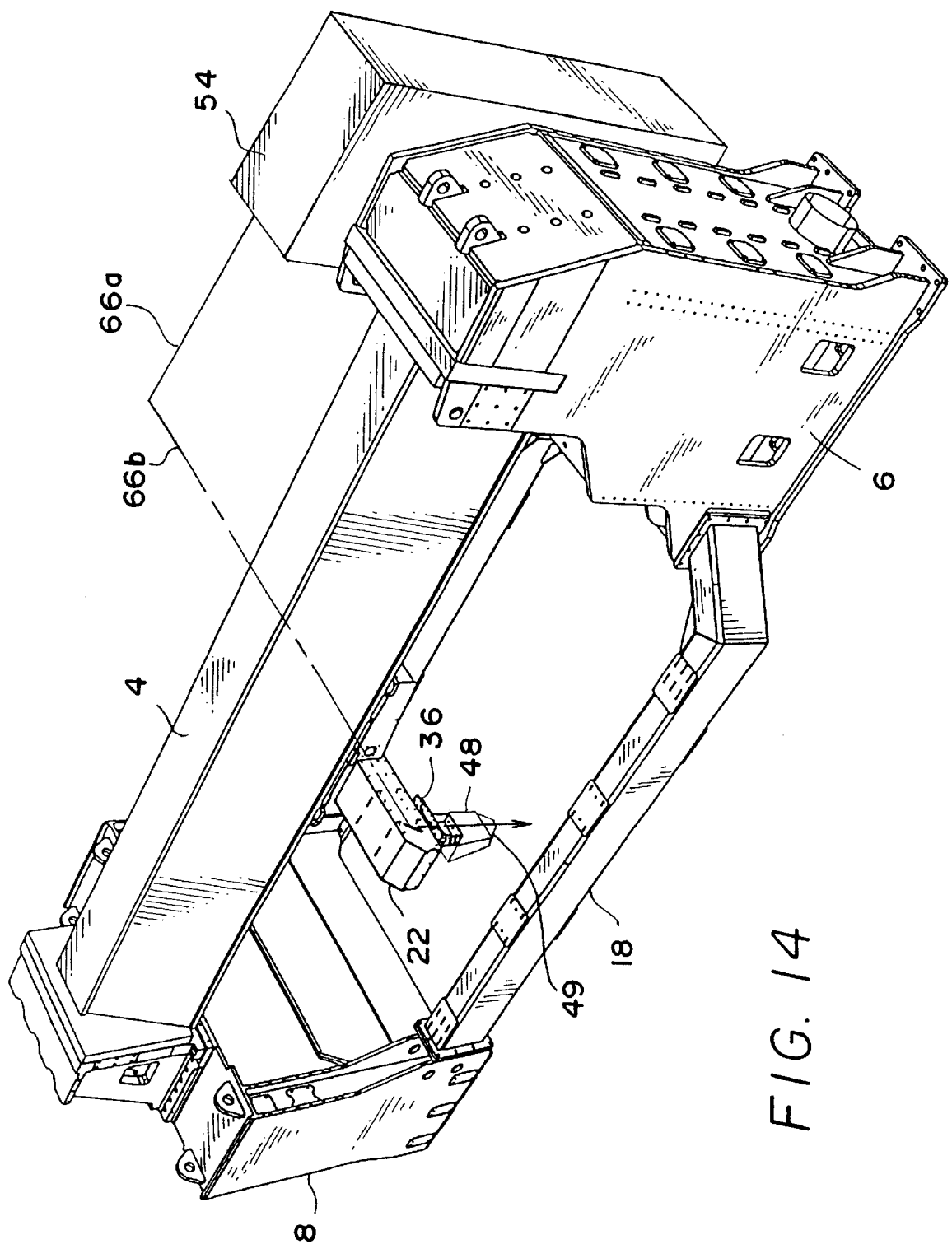
FIG. 14 is a perspective view of the frame structure and the base member and the laser resonator mounted adjacent to the frame for illustrating the path of the laser beam from the laser resonator to the cutting head of the laser cutting system of the instant invention.
Figure 15:
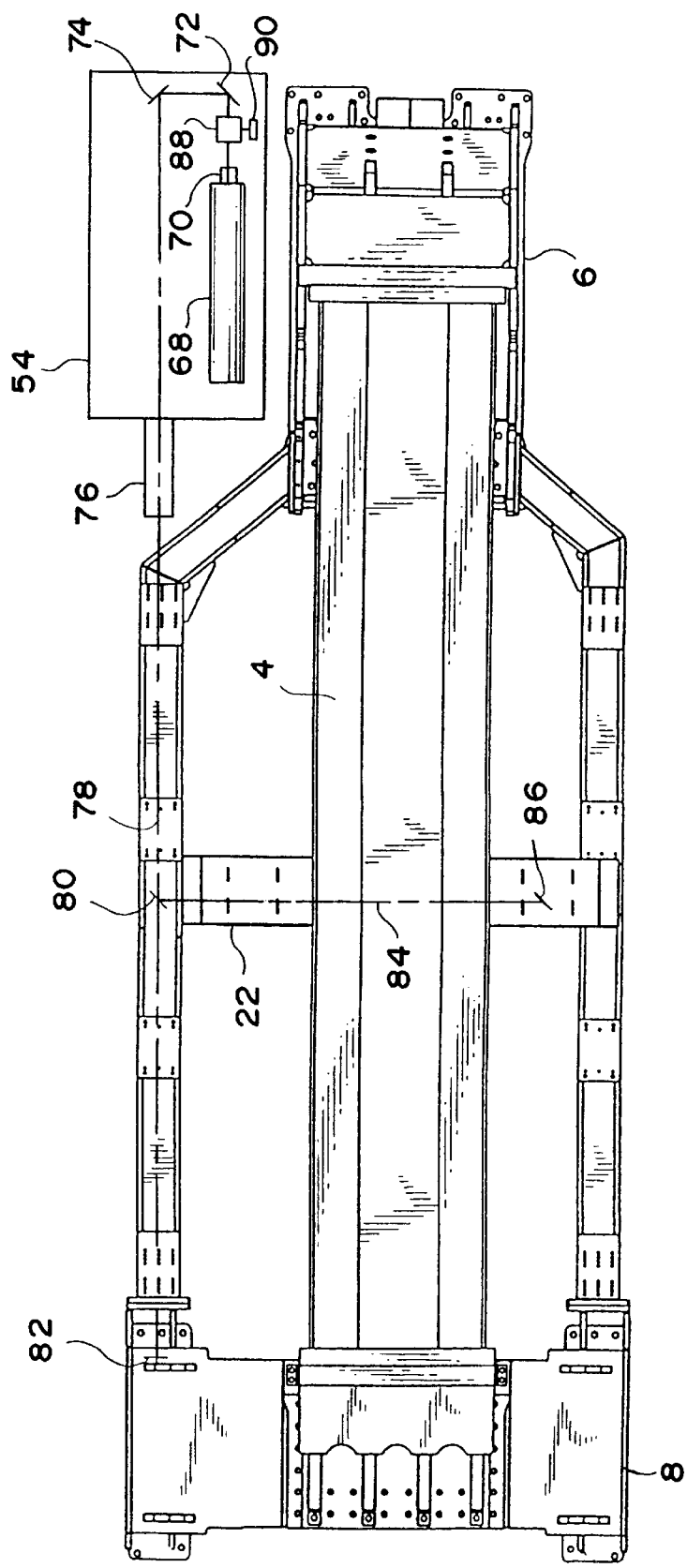
FIG. 15 is a plan view illustrating the laser resonator, the inside components of the laser resonator, and the alignment of the laser beam from the laser resonator, as well as the path of the laser beam to the cutting head.

FIGS. 14 and 15 illustrate the pathway in which a laser beam 66 is output from a laser resonator 54 to cutting head 48 and out of its nozzle 49 for piercing a worksheet. Specifically, inside laser resonator cabinet 54 a laser resonator 68 would generate a laser beam that is output from an optical output coupler 70. The laser beam is then reflected by mirrors 72 and 74 so as to be emitted at output port 76 along the direction indicated by beam path 78. A laser mirror 80 allows the laser beam 66 to be routed to a target 82 for alignment purposes and, at the same time, redirects the laser beam 66 along laser path 84 to yet another mirror 86 that redirects the laser beam to cutting head 48 and out of its nozzle 49, as shown in FIG. 14. Output coupler 70 and other beam mirrors maintain the distance of the laser beam being output to a predetermined distance that is deemed to be useful, i.e., by maintaining the requisite density and power for the laser beam to pierce a worksheet. The laser generator inside laser cabinet 54 can be purchased from a number of companies including for example the Wegmann-Baasel Company of Germany.

An improvement to a conventional laser resonator of the instant invention laser cutting system is the utilization of a telescopic lens 88, that is controllable for example by a servomotor such as 90, which automatically focuses the laser beam to maintain a constant density and power for the laser beam for a predetermined distance away from output port 76. By maintaining a constant density and power for the laser beam for the predetermined distance, such as for example 5 meters away, the beam is able to perform optimal piercing and cutting of a workpiece. As shown in FIG. 15, such predetermined distance may extend from the output of output port 76 to substantially the full length of the area between support structures 6 and 8, so as to accommodate the movement of laser cutting head 48 mounted to base member 20 along the length of cross beam 4.

The telescopic lens system may comprise a telescopic lens 88 that is movable along the length of the laser beam so as to provide a focusing effect to maintain constant the density and power of the laser beam output from window 76. In place of a movable telescopic lens such as 88, a mirror type telescope system may also be used. In conjunction with the servomotor such as 90, a threaded screw or other types of drive mechanism may be used for moving telescopic lens 88 relative to output coupler 70. Note also that even though resonator cabinet or housing 54 is shown not in contact with frame structure 2, in actuality, resonator cabinet 54 may be physically coupled to frame structure 2, as for example by links and bolts, so that both laser resonator 68 and frame structure 2 may be moved in unison to thereby maintain the alignment of the laser beam with respect to frame structure 2.

With the telescopic system, auto-focusing of the laser beam, with respect to the worksheet, can be effected by providing a feedback signal from the cutting head to the CNC controller that informs the controller whether or not focusing is required. When the feedback received from the CNC controller indicates that indeed focusing is required, the CNC controller would send a signal to servomotor 90, or to be more precise via instructions to the controller of servomotor 90, to move telescopic lens 88 relative to coupler 70 so as to automatically refocus the laser beam, to thereby maintain constant its density and its power. The providing of a feedback of the cutting head to the CNC controller will be further described with the discussion of the cutting head in FIG. 18.

Although not shown, there is provided within electronic cabinet 52, in addition to CNC controller, at least one memory store (hard disk, tape drive, magnetic memory store, etc.) that contains information in regard to the focal movements during fabrication of the worksheet, such as for example piercing or cutting, so that lens 88 can be repositioned relative to output coupler 70 each time the laser beam reaches its stop point. This allows the focal point of the laser beam to be adjusted even during the fabrication of the worksheet. Thus, the auto-focusing function of the laser cutting system of the instant invention has three different subfunctions. These include: (1) to change the focal point according to the selection of the type of worksheet material; (2) to change the focal point on line according to the length of the laser beam of the laser cutting system; and (3) to effect focal movements during piercing so as to have the maximum energy at the point where actual piercing takes place. Subfunction 2 is meant to provide compensation for the beam divergence when the laser beam path is somewhat longer than the optimal predetermined beam path, and subfunctions 3 is used to reduce the piercing time.

As for the types of materials that may be affected by the focal point changes, note that depending on the type of material to be cut, the focal point may actually be located negatively, positively or at zero, with respect to the worksheet. This is because the focal point of the laser beam may actually be somewhat above, below or at the surface of the worksheet. For example, a normal steel worksheet that has a thickness of approximately 1–6mm requires that the focal point be at the surface of the worksheet. Alternatively, a normal steel worksheet that has a thickness of approximately 8–20mm requires that the focus of the laser beam be approximately 1 mm above the surface of the worksheet. Furthermore, a stainless steel worksheet with a thickness of approximately 1–10mm requires that the focal point be negative, i.e. the focal point is below the bottom surface of the worksheet being processed. As for a worksheet that is made of aluminum having a thickness of 1–6mm, the focus of the laser beam is deemed to be at optimum at approximately ⅓ of the thickness of the worksheet below the surface of the worksheet. Worksheets made of other materials such as for example wood and other synthetics require less stringent focal points. Of course, other parameters and known factors such as for example the power of the laser beam and the density of the laser beam may also need to be taken into account to effect the position of the focal point.

During fabrication such as for example piercing, to enable the system of the instant invention to continuously adjust the focal point on line, a set-up table or memory store that contains the start point and the stop point is provided to the CNC controller for repositioning the cutting head along the z direction to effect auto-focusing. For the instant invention, this is done by taking into consideration the actual length of the laser beam (from the laser resonator output to the cutting head along the x and y directions), and comparing it with the maximum predetermined laser beam length. The maximum useable length of the laser beam in turn is divided into a number of quadrants, or zones. Each of the zones is provisioned (in the set-up table or memory store) with a particular correction factor so that when the actual laser beam length falls within that quadrant, the correction factor, be it a negative or positive number, is used to adjust the focal point of the laser beam.

For further illustration, see FIG. 31 which shows the maximum predetermined length of the laser beam, designated as 220. The maximum length of the laser beam in turn is divided into a number of sectors, quadrants or zones 222a–222h etc. A correction factor, such as for example 0–0.5mm in zone 222a, is provided in each of the zones. Also shown in FIG. 31 is the actual length of the laser beam, designated for example by 224a and 224b, representing the x and y axes of the beam path, respectively. Thus, for the exemplar laser beam 224 shown in FIG. 31, given that it ends at zone 222g, a correction factor of 3–3.5m, be it positive or negative, is added to the focal point by refocusing the laser beam via, for example, the movement of telescopic lens 88 relative to output coupler 70 (as shown in FIG. 14). Note that even though the correction numbers in zones 222 are shown as positive numbers, in actuality, these numbers are integers that could be either positive or negative numbers, depending on the type of materials being fabricated, so that the auto-focusing of the focal point may be effected either above the worksheet, below the worksheet, or at the surface of the worksheet, as previously discussed. Thus, there may be stored in the set-up table a plurality of the exemplar series of zones as shown in FIG. 31, one for each type of material of the worksheet that is to be fabricated.

Figure 16:
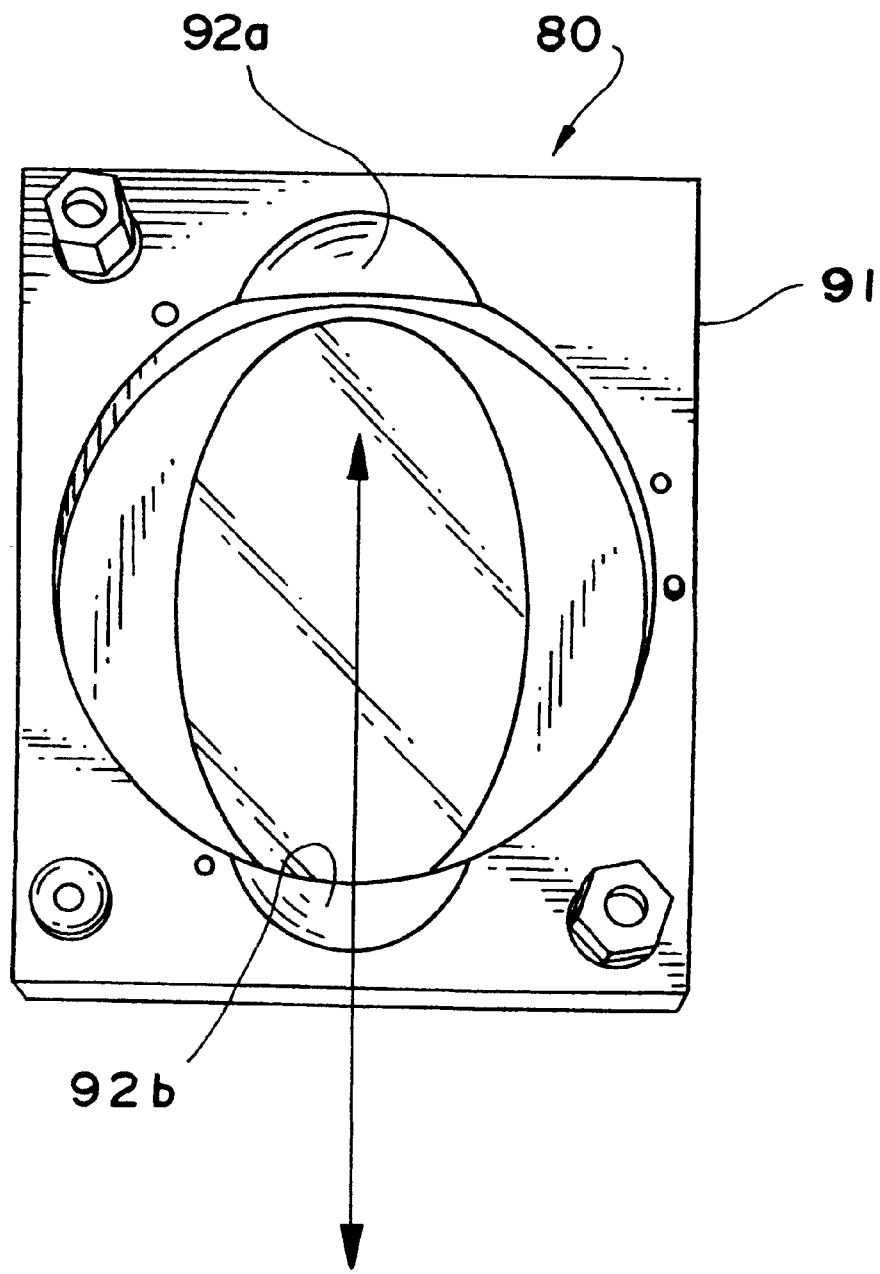
FIG. 16 contains a frontal view of the reflective mirror of the laser cutting system of the instant invention used for alignment of the laser beam.

Another improvement of the present invention laser cutting system is the use of a particular type of mirror at a location such as 80 for enabling laser beam 66 to be aligned per target 82, without having to have the complete mirror assembly disassembled as required by most of the prior art laser cutting systems. Specifically, as shown in FIG. 16, the improved laser mirror 80 of the instant invention has a block portion 91 that has a notch 92a and another notch 92b. By thus providing the respective notches, a laser beam such as 66 that is output from output window 76 can directly pass through block 91 and be aligned with target 82. Thus, the only thing that needs to be done with respect to reflective mirror 80 for the laser cutting system of the instant invention is the removal of the actual mirror itself, such as 94 shown in FIG. 17, without having to remove the mirror block 91 from the system. Contrast this with most of the prior art laser cutting systems that require the removal of the mirror blocks from the system in order to align the laser beam, which means that after the alignment of the laser beam, the mirror block further has to be reassembled. Oftentimes, such reassembly would cause misalignment of the laser beam. For the instant invention, the fact that the mirror block 91 is not removed means that once the laser beam is aligned, it remains aligned as it is only mirror 94 that is removed from reflective mirror assembly 80.

Figure 17:
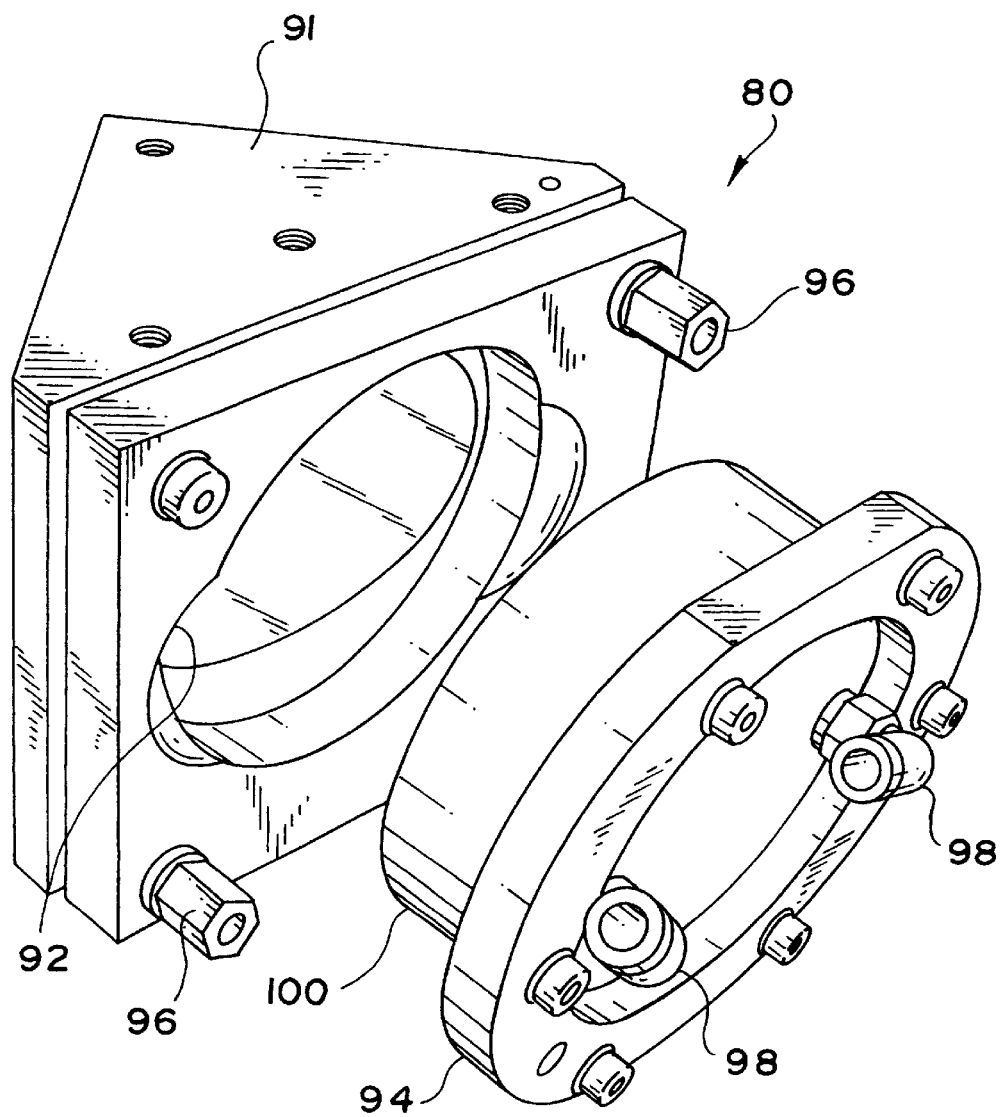
FIG. 17 is a perspective view of the reflective mirror of the laser cutting system of the instant invention.

As shown in FIG. 17, mirror 94 is matably mounted to mirror block 91 and fixedly coupled thereto by means of bolts 96. As is well known, mirror 94 has complemented thereto circulation tubings such as 98 that allow cooling fluid be directed to the mirror (actually behind casing 100), so as to maintain the temperature of the mirror constant as it is being impacted by the laser beam. By providing cooling to the mirror, the mirror is prevented from warping to thereby ensure the integrity of the laser beam.

Figure 18:
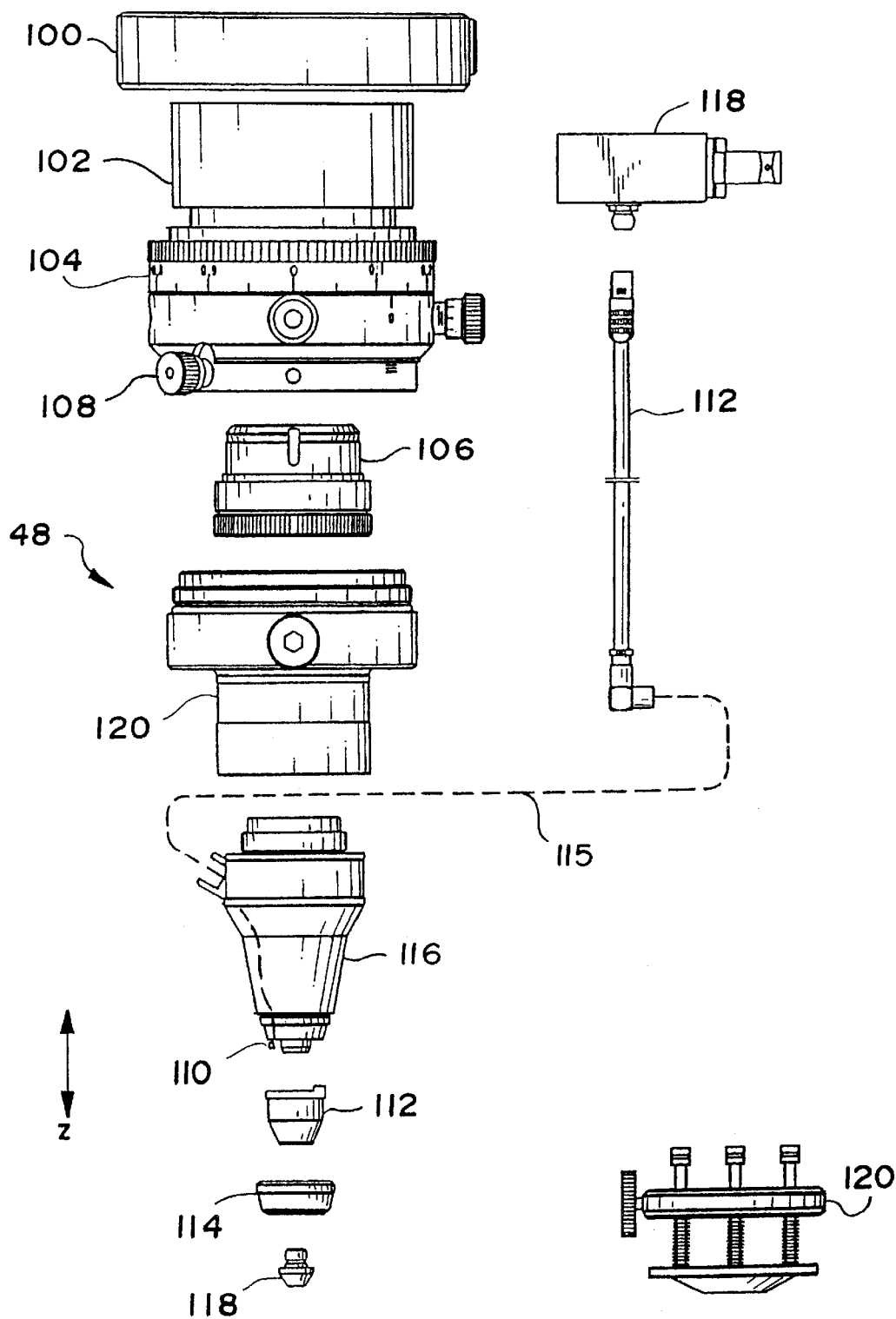
FIG. 18 is a disassembled view of a laser cutting head.

FIG. 18 shows a conventional type of cutting head that can be purchased from a number of manufacturers including for example the Precitec Company of Germany. As shown, cutting head 48 has a collision protection mounting 100 that is coupled to frame member 30 for absorbing any impact cutting head 48 may have with frame member 30 when the former is driven in a vertical direction along the z axis. A top mounting 102 provides a coupling to frame member 30 to allow a conduit through which the laser beam may pass. An upper focusing part 104 of laser head 48 enables the user to adjust the focus of the laser beam, per moving the focusing lens, which is held by a lens holder 106, for adjusting the focal point of the laser beam.

The focusing of the laser beam may also be effected in a direction substantially perpendicular to the z direction by using a control screw 108. In fact, for the laser cutting system of the instant invention, it is envisioned that the adjustment of the focusing lens being held by lens holder 106 be effected by servomotors that take into account the feedback provided by a capacitance or non-contacting sensor 110 that senses the distance separating the tip of the laser cutting head from the top surface of the worksheet. The signal from the electrode 110 in turn is sensed and forwarded to electrode cable 112, which is shown, per dotted line 114, to be inserted into the sensor portion 116 of the cutting head. Electrode cable 112 in turn is connectable to a preamplifier 118 that in turn is electrically connected to the CNC controller for relaying thereto whatever signals are sensed by sensor 110, to thereby establish the feedback for determining how far the tip of the cutting head is from the surface of the worksheet.

Cutting head 48 further includes an adapter portion 120 to which lower insert portion 116 is matable with. Adapter 120 in turn is mated with upper part 104, so as to enclose lens holder 106. Cutter head 48 further includes a ceramic non-conductive tip 112 that is mated to the tip of insert portion 116. A nut 114 secures ceramic portion 112 to the lower insert 116. A nozzle electrode 118, which is fitted to ceramic portion 112, completes the laser cutting head 48. It is through electrode nozzle 118 that the laser beam is output for fabricating the worksheet. For those instances where non-metallic worksheets are being fabricated, a tactile electrode or contacting sensor 120 is used in place of nozzle electrode 118.

Figure 19:
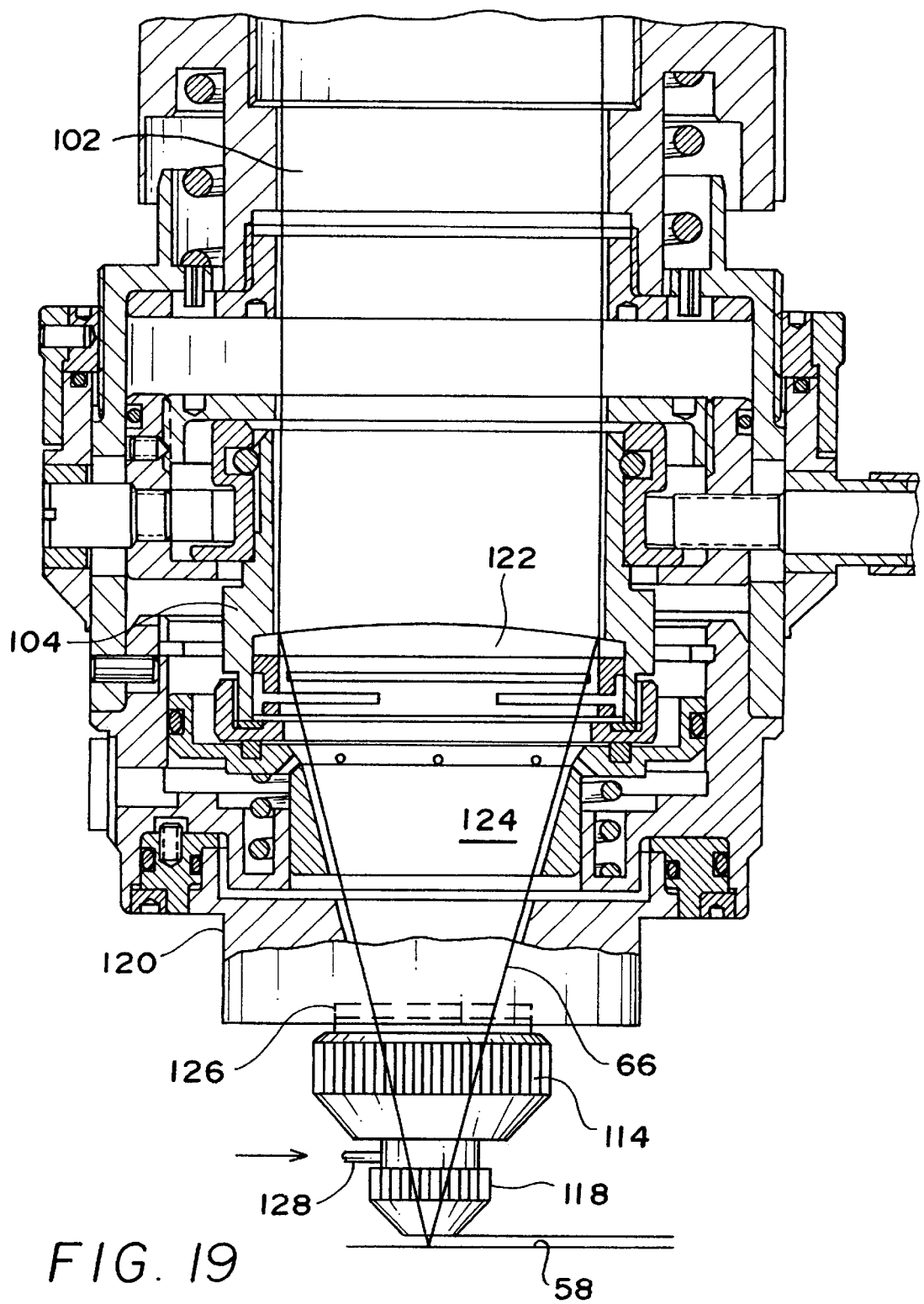
FIG. 19 is an assembled view of a portion of the laser cutting head of FIG. 18 illustrating in particular the placement of a partition lens for protecting the focusing lens of the laser head.

FIG. 19 illustrates the improvement to the cutting head shown in FIG. 18 for the laser cutting system of the instant invention. In particular, prior to the instant invention, lens 122, which is held by lens holder 106, in effecting the focusing of the laser beam 66, is assisted by the input of lasing gas within the space designated 124. This is all well and good so long as the debris, particles and parts that result from worksheet 58 being pierced or cut by laser beam 66 does not ricochet back into chamber 24 and end up impacting the lower surface of lens 122. Given that the cost of focusing lens 122 is high and its sensitivity is of relative importance, by exposing lens 122 to potential impacts caused by ricocheting debris or particles, the life expectancy of lens 122 is shortened. In fact, one of the major cost of a laser cutting system is the often replacement of lens 122.

The laser cutting head of the instant invention overcomes this shortcoming by interposing a partition window 126 between focusing lens 122 and nozzle 118. Partition window 126 may be made of diamond or some other translucent material that has the same qualities of diamond, i.e., hardness and resistance to scratching, and the characteristic of allowing laser beam 66 to pass therethrough without much effect. Note that although partition window 126 is shown to be located at the lower part of lower portion 120, it could in fact be placed within lower insert 116, which is held in place by nut 114. Given that the space from the tip of electrode nozzle 118 to partition window 126 is much less than the volume provided in chamber 124, the amount of lasing gas provided to input 128 that acts in conjunction with laser beam 66 to pierce the worksheet can be substantially reduced. Partition window 126 therefore achieves the dual objectives of prolonging the life of lens 122 as well as decreasing the amount of lasing gas required for coacting with the laser beam for piercing the worksheet.

Figure 20:
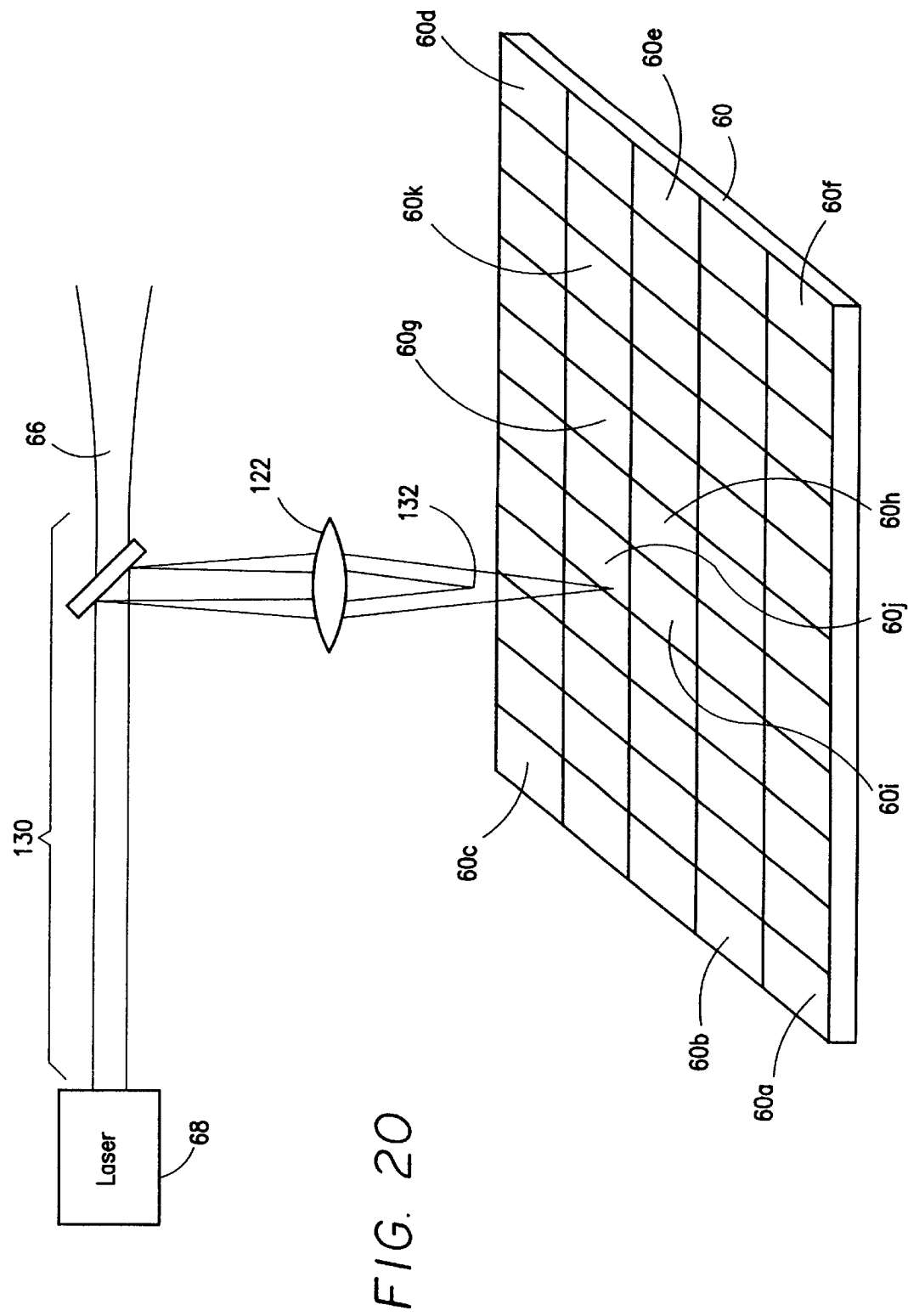
FIG. 20 is an illustration of the focusing of the laser beam at the various partitioned locations of a worktable.

With reference to FIG. 20, the maintenance of the optimal power for the laser beam that works hand in hand with the auto-focusing of the focal point is described. As is known conventionally, when output from the laser resonator, the laser beam is never quite parallel. In other words, the laser beam tends to be slightly diverted so that it would appear such as the beam 66 shown in FIG. 20. That notwithstanding, as was mentioned previously, a portion of the laser beam nonetheless is useful, provided that the diameter of that portion of the laser beam is kept to be substantially parallel so as to contain substantially the same diameter and the same density. For laser beam 66 shown in FIG. 20, assume for the moment that such parallel portion exists at the portion of the beam designated 130. Thus, so long as focus lens 122 (cutting head 48 is not shown for the sake of simplicity) is moved within the distance designated by 130, an accurate focal point is provided for a worksheet placed on worktable 60. But as it can be seen in FIG. 20, worktable 60 in fact extends beyond distance 130 whereby the density of the laser beam is maintained constant. What this means is that the focal point of the laser beam, for example 132, would be off for the portion of the laser beam that diverges. This is equivalent to the laser beam losing power because of its distance from the laser resonator 68. For the instant invention laser cutting system, to compensate for this loss of power, worktable 60 is divided into a number of predetermined zones or sections each having correction data that may be obtained empirically on a prototype laser cutting system that has undergone a great number of testing.

For the exemplar system shown in FIG. 20, therefore, suppose instead of being directed to an area 60*j* of worktable 60 (assuming area 60*j* is the area on the worksheet placed over worktable 60 at which laser beam 60 is piercing), focusing lens 122 is to be focused onto the portion of the worksheet that superposes over section 60*k*. At this point, note that laser beam 66 has substantially diverged. From the empirical data collected and stored in the memory store which is retrievable by the CNC controller, suppose that at area 60*k* of worktable 60, there is provided a correction data of 0.10 mm. Given that and the fact that the CNC controller gets a feedback from the capacitance sensor 110 (FIG. 18) of the distance separating the cutting head from the surface of the worksheet, appropriate correctional movement may be output by the CNC controller to instruct the servomotor to reposition focusing lens 122 with the appropriate correction data which, in this instance, is 0.10 mm toward the worksheet (assuming that the correction is plus 1.0 mm in this instance). Therefore, by dividing the worktable into different zones, areas or sections having their respective coordinates in terms of the x and y axes, the worktable in essence is divided into a number of matrixes each having its own correction data that can be used to correct any divergence of the laser beam, to therefore maintain a laser beam that has substantially the same power density for every area on the worktable onto which a worksheet may be placed.

Figure 21:
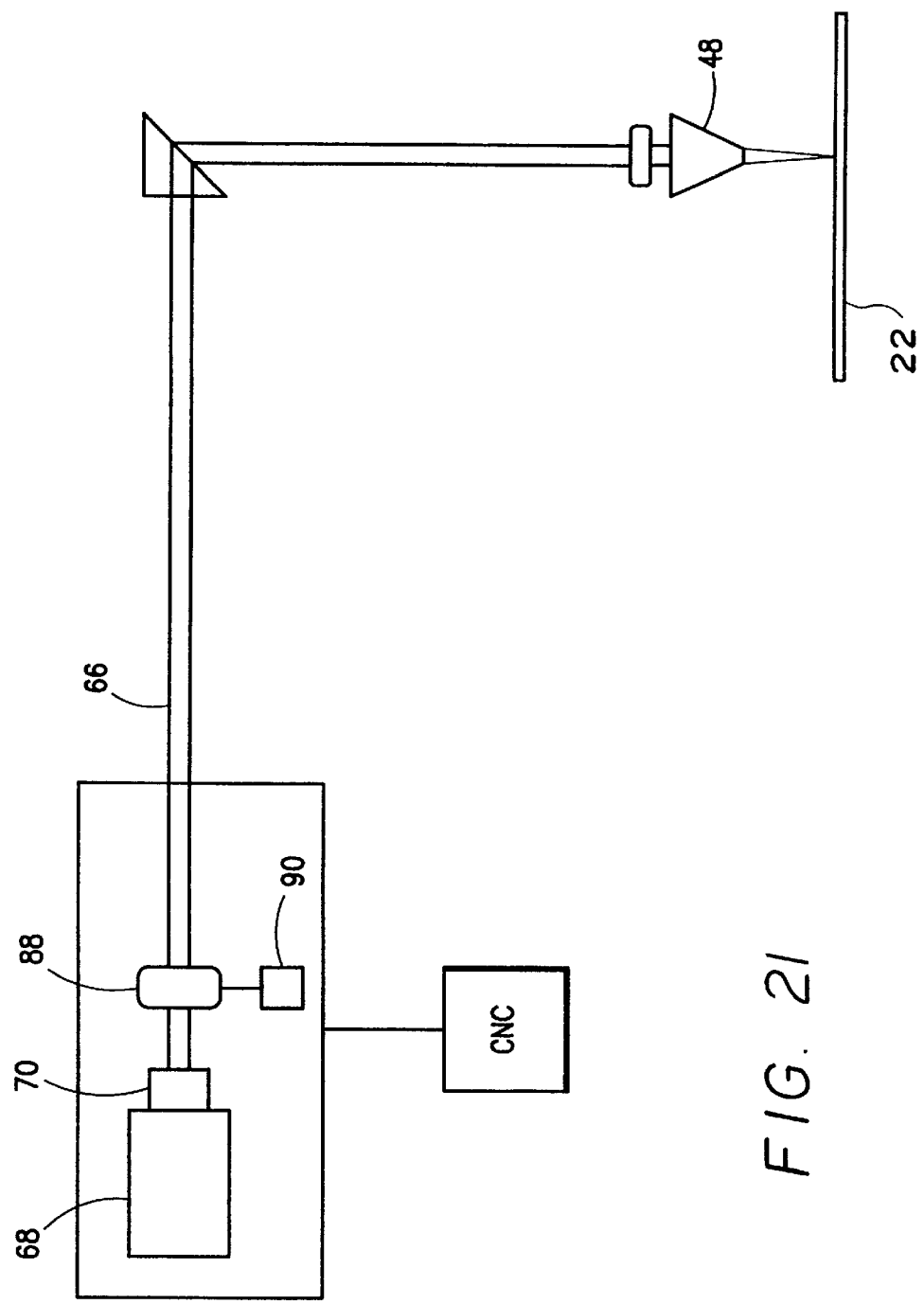
FIG. 21 is an illustration of the routing of a laser beam and the cooperation between the telescopic device and the output coupler in the laser generator for regulating the focusing of the laser beam.

FIG. 21 illustrates in a simplified schematic format the controlling of the adjustment of the laser beam by the CNC controller. This corresponds to the laser resonator portion shown in FIG. 15 in which the beam width and density of laser beam 66 can be controlled by the interaction between output coupler 70 and telescopic lens 88, which is driven by a servomotor 90. The instructions for activating servomotor 90 for driving telescopic lens 88 in relation to output coupler 70 are provided by the CNC controller, which in turn receives feedback from cutting head 48.

The way in which the cutting head is moved relative to a worksheet for the instant invention laser cutting system is effected by a "ping pong" process whereby an optimal movement of the cutting head is calculated for moving it from one location to a next location on the worksheet. In particular, with reference to FIGS. 22 and 23, note that a worksheet may have already cut thereinto a number of holes or cuts. The ping pong process of the instant invention allows the laser cutting head positioned at a first location, for example at 130, to be moved to a next location, for example 132, at an optimal rate. This is done by the CNC controller, in conjunction with an interpolation process, based on the determination of a number of things.

Figure 22:
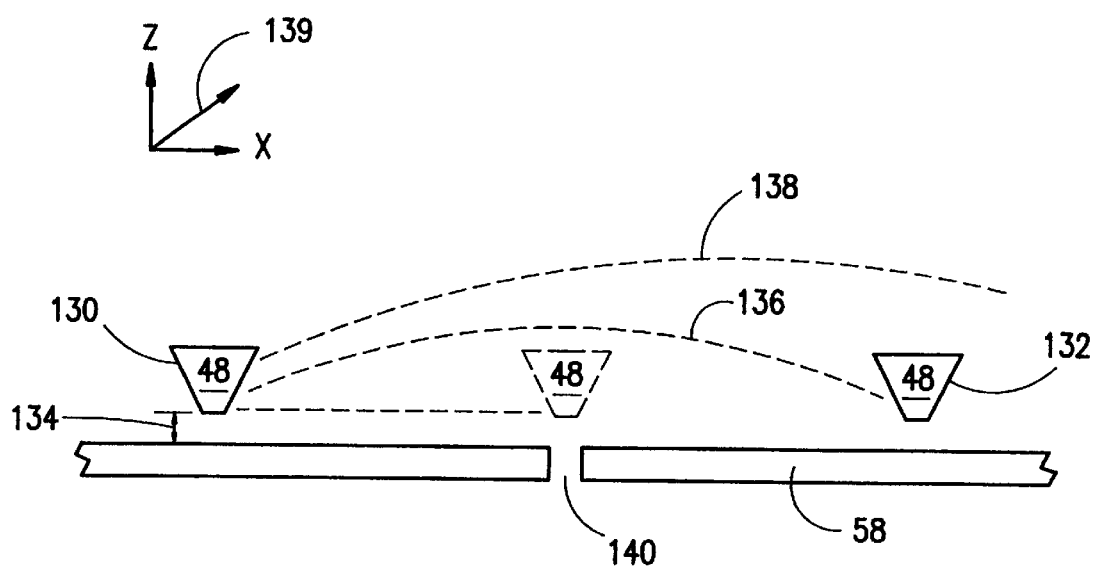
FIG. 22 is an illustration for enhancing the understanding of how the cutting head of the instant invention laser cutting system is moved.

One of the items that is determined is the focal distance that separates the nozzle from worksheet 58, for example the distance designated 134. Another item that needs to be determined is the distance separating the location where the cutting head is and the next location where the cutting head needs to be for the next fabrication process on worksheet 58. In other words, the CNC controller has to know the distance separating points 130 and 132. For the interpretation process, it is assumed that the shorter the distance between 130 and 132, the less likely the cutting head needs to be elevated along the z direction as indicated in FIG. 22. On the other hand, if the distance separating points 130 and 132 is great, and if cutting head 48 were to be elevated sufficiently above worksheet 58, the speed at which cutting head 48 may be moved between the two locations can be incrementally increased. Such elevation of cutting head 48 is indicated in FIG. 22 by, for example, dotted lines 136 and 138. Note that 138 indicates that cutting head 48 is to be moved further away from worksheet 58 inasmuch as the next location to which it is to be moved is further than location 132. Of course, it is understood that the higher cutting head 48 is elevated from worksheet 58, the less the chance that any flexing of worksheet 58 could cause it to come into contact with cutting head 48.

For those instances where the worksheet already has prefabricated holes, either through previous punching or cutting, when laser head 48 encounters such a hole, such as for example 140 shown in FIG. 22, due to the capacitance sensing of the distance separating the surface of worksheet 58 and the nozzle electrode of cutting head, prior to the instant invention ping pong process, the cutting head would naturally move down towards worksheet 58 since it has no knowledge that hole 140 is present; and in certain instances, if a predetermined stop distance has not been programmed into the CNC controller, cutting head 48 would actually come into contact with worksheet 58. The movement process of the instant invention eliminates such inadvertent contact by instructing cutting head 48 to move from a first location to a next location by an elevation vector such as 139, distance permitting between the locations. In other words, cutting head 48 would, similar to the actions of a ping pong ball, bounce from one location to the next.

To obtain the optimal movement for cutting head 48, a number of parameters are programmed into the CNC controller so that the various operations for fabricating a hole or cut in a worksheet are synchronized. To wit, the movement of the laser cutting head 48 is synchronized with the outputting of the laser beam from the laser resonator. For example, when the laser cutting head has finished piercing a hole in a first location, just before cutting head 48 is to begin its movement to the next location, the laser beam is turned off at the laser resonator. And just prior to cutting head 48 reaching the next location, for example 132, the laser resonator would begin to generate the laser beam so that the output of the laser beam is timed such that it begins to pierce worksheet 58 as soon as cutting head 48 has stopped at location 132 and the focal point separating cutting head 48 and worksheet 58 is at the appropriate height. The same process is effected with the respect to the movement of cutting head 48 to its next location. For example, as soon as the piercing or cutting of worksheet 58 is completed at location 132, cutting head 48 begins its movement to the next location at the predetermined elevation and speed, and the laser resonator begins to turn off the laser beam. This process is repeated until all locations on the worksheet that need to be fabricated are done.

Figure 23:
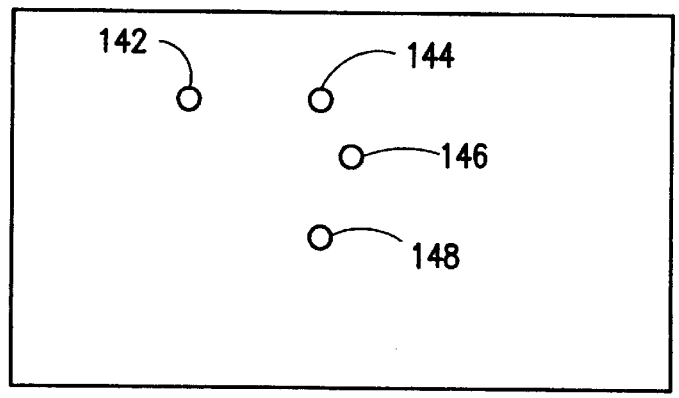
FIG. 23 is a plan view of a worksheet with various holes therein for further illustrating the cutting head movement of the instant invention.

FIG. 23 provides an illustration of the relationship between the distance separating different locations and the speed with which cutting head 48 is moved. For example, the distance separating locations 142 to 144, as represented by the shown circles or holes, is greater than the distance separating locations 144 and 146. Accordingly, cutting head 48 may be elevated to a higher height and moves faster from location 142 to 144. Insofar as location 144 to 146 is separated by a shorter distance, the elevation of cutting head 48, if any, would be lower than the elevation of cutting head 48 between locations 142 and 144, as it travels from location 144 to 146. An optimal time nonetheless is maintained for cutting head 48 to move from location 144 to location 146 insofar as the distance separating those locations is relatively short. Putting it simply, there is no need to elevate cutting head 48 if the distance separating a first location to a second location is small, for example 5 mm. Thus, by determining the coordinates in which laser cutting head has to move and the spatial relationship between the various locations, an optimal movement for moving cutting head 48 from location to location superposing the worksheet can be interpolated.

Figure 24:
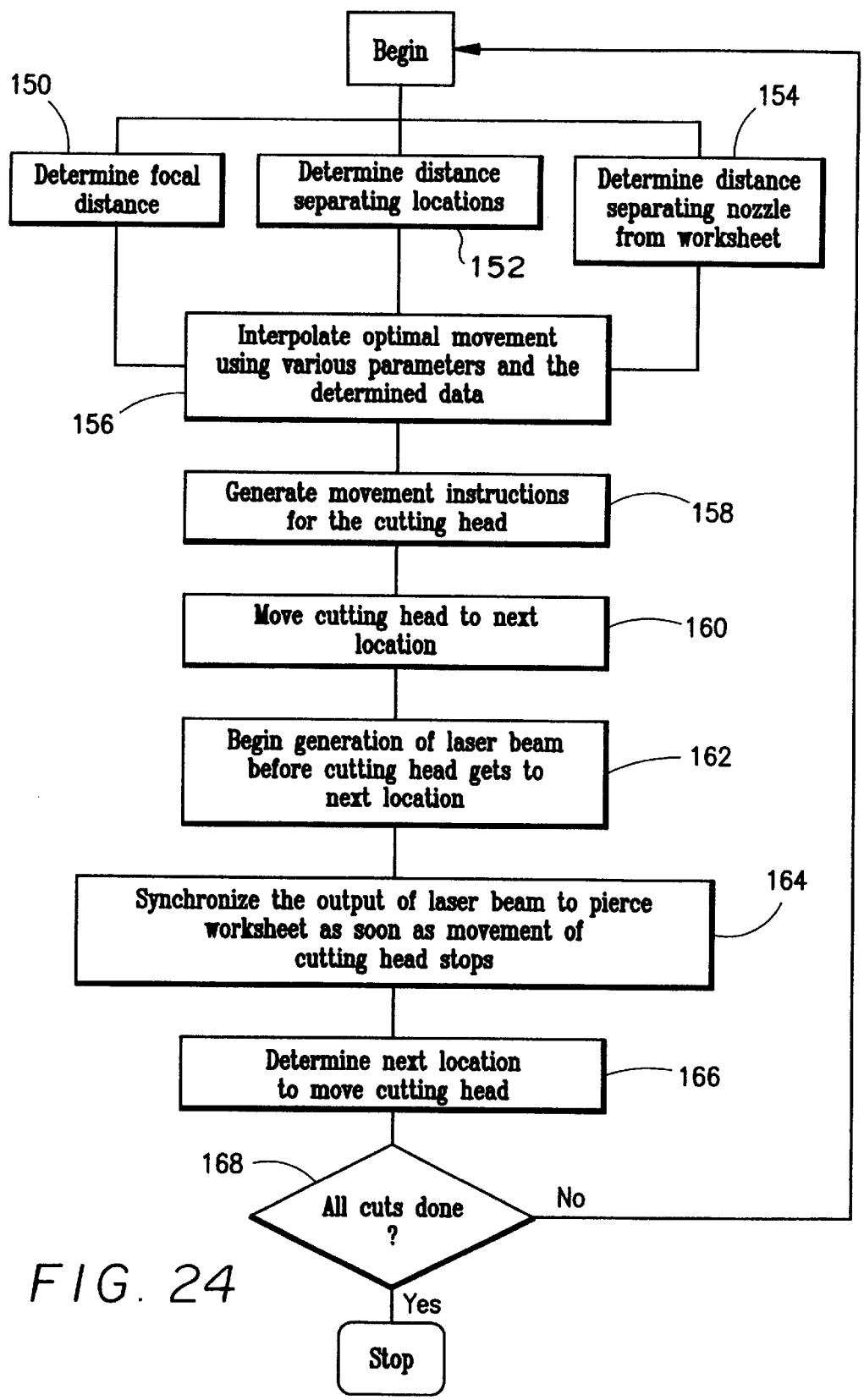
FIG. 24 is a flow chart illustrating the process of moving the laser cutting head of the instant invention.

A flow chart illustrating the process of moving the laser head of the instant invention is given in FIG. 24. The process begins by determining the focal distance between the laser cutting head and the worksheet at step 150. At or about the same time, a determination is made of the distance separating the various locations per step 152. Further, a determination is made on the distance separating the nozzle from the worksheet per step 154. These determined data are taken into consideration with various predetermined parameters which, in addition to those mentioned previously, may also include the weight of the laser cutting head, the acceleration and deceleration that are needed for moving the laser head and stopping it, and other data such as for example how long it takes the laser beam to be turned on and off and travel to the cutting head, etc. Using these various parameters and determined data, the optimal movement for the laser cutting head is interpolated per step 156. Thereafter, the instructions to the cutting head for the optimal movement are generated per step 158. With those instructions, the CNC controller can instruct the motor mechanism such as for example the linear drives and the servomotors to move the laser cutting head from one location to the next, per step 160. The laser beam is generated and provided to the cutting head per step 162 right before the cutting head gets to its next lactation. Thereafter, the output of the laser beam is synchronized with the movement of the laser cutting head so that the laser beam is output as soon as the movement of the cutting head has stopped, per step 164. Step 164 takes into account the termination of the laser beam as the laser cutting head begins its movement to the next location. At step 166, a determination is made of the next location to which the cutting head is to be moved. And a determination is made per step 168 on whether all cuts have been effected on the worksheet. If no, the process continues. If all cuts indeed have been made on the worksheet, the process stops.

Figure 25:
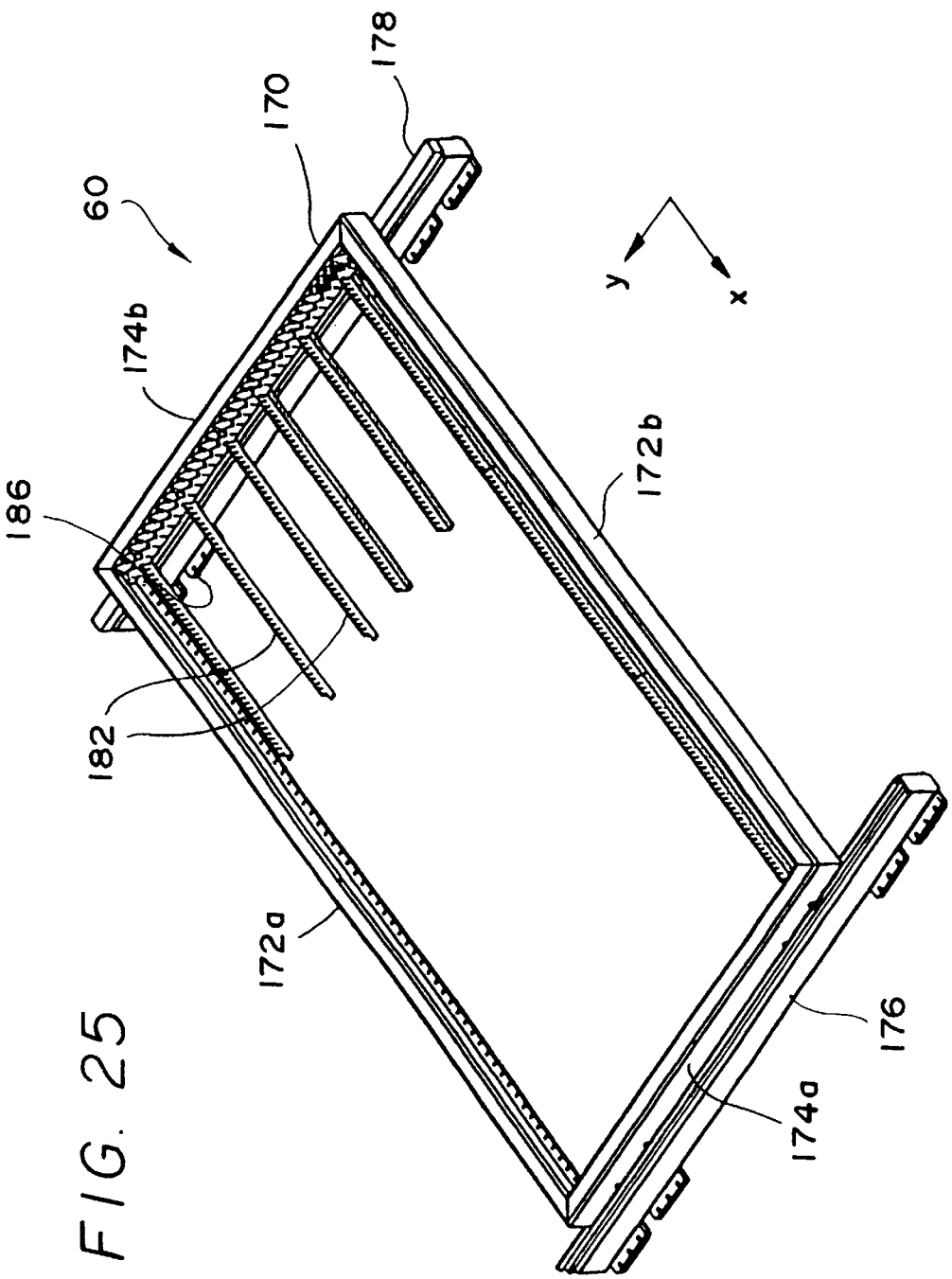
FIG. 25 is a sectional perspective view of the various components that make up a worktable cassette.

With reference to FIG. 25, worktable 60 that is placed in the working area of the laser cutting system of the instant invention is shown. Worktable 60 may also be referred to as a cassette. As shown, worktable 60 has a frame 170 that comprises two long sides 172a and 172b, and two short sides 174a and 174b.

Figure 27:
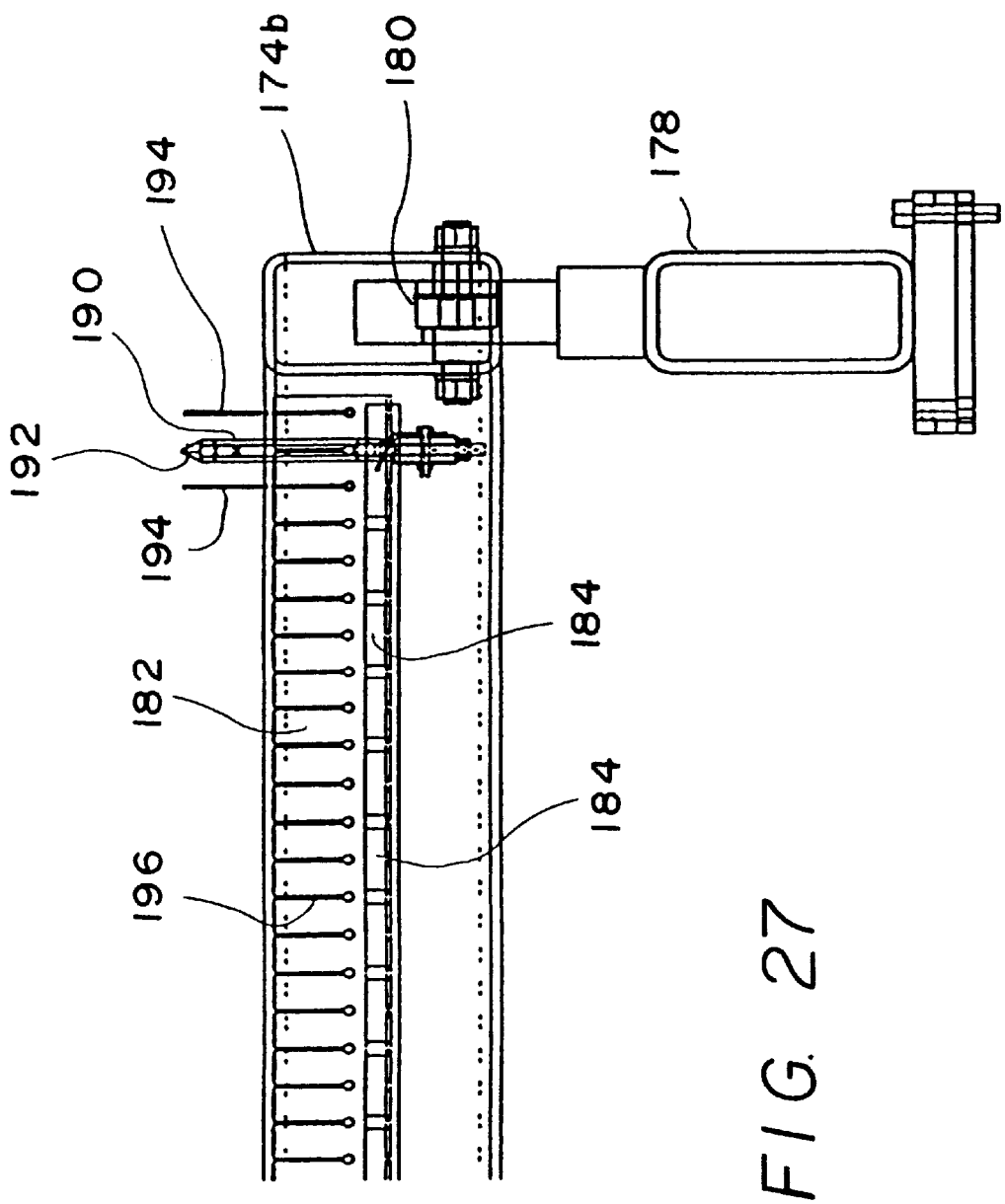
FIG. 27 is a front view of a portion of the cassette, and how it rides on the rails as shown in FIG. 25.

Frame 170 is movably mounted on two rails, or slides, 176 and 178. Insofar as worktable or cassette 60 is movable along the y direction, the worksheets placed thereon (either before fabrication or afterwards), can be retrieved readily from either side of the laser cutting system, as shown for example in FIGS. 10 and 11, as frame 170 can be readily moved through doors 56 and door 64 at respective sides of the laser cutting system of the instant invention. As best seen in FIG. 27, frame side 174b rolls per roller 180 along rail 178 while frame side 174b slides along rail 178.

Figure 26:
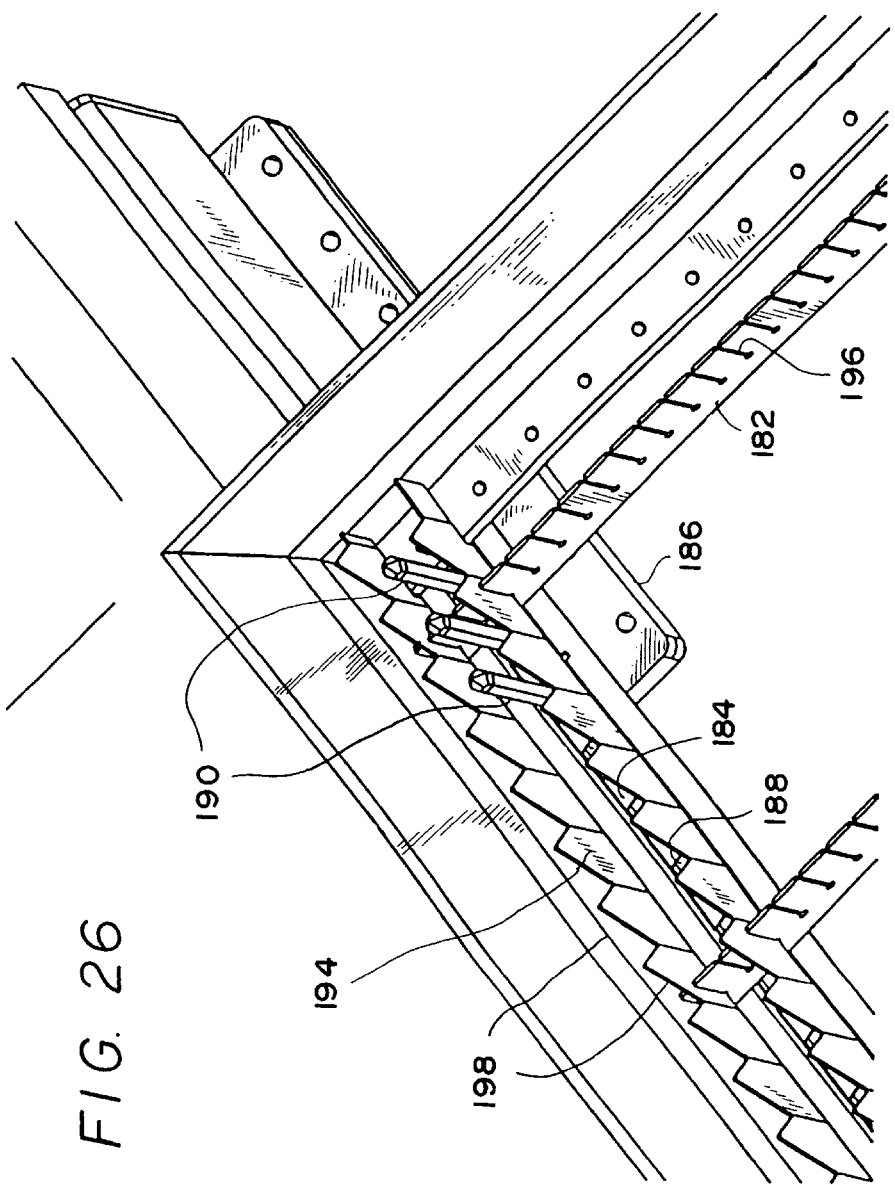
FIG. 26 is an enlarged perspective view of a corner section of the cassette of FIG. 25.

Further with reference to FIG. 25, it can be seen that there are a number of support brackets 182 extending along the x direction of frame 170. With specific reference to FIGS. 26 and 27, a plurality of strips 184 each extending along they direction of frame 170 from side 172a to 172b are shown. These strips are supported by base members 186, only a few of which are shown in frame 170 in FIGS. 26 and 27. Formed along the length of each of strip members 184 are a corresponding number of bores 188 into which a number of pins 190 are fixedly mated to. Each of pins 190 has a replaceable tip that is made of a soft metal such as for example copper or brass. Further mounted to frame 170 is a plurality of ribs 194. These ribs are mounted to selected slots 196 of the support brackets along the length of frame 170 at the x direction, and are interspersed with the plurality of strips having the bores through which pins 190 are mounted. Each of ribs 194 has an upper or top portion that is shaped with a number of contiguous teeth 198.

Thus, frame 170 has alternate rows of pins and teeth along its x direction for supporting a worksheet, such as for example 58 placed thereon. In fact, tips 192 of pins 190 form a plane that is slightly higher than the plane that is formed by the tips of the various teeth 198 of ribs 194. The fact that the pins form a higher support plane than the teeth means that the worksheet is mainly supported by the pins. This is desirable insofar as there is less of an area of the worksheet that is being supported. The fact that tips 192 of pins 190 are replaceable means that when the tip of a pin is worn out, such as for example by being repeatedly impacted by the laser beam, only that tip needs to be replaced, as there is no need to replace the entire pin. The ribs are used to support those portions of the worksheet that are either cut from the worksheet or have sagged somewhat.

Figure 28:
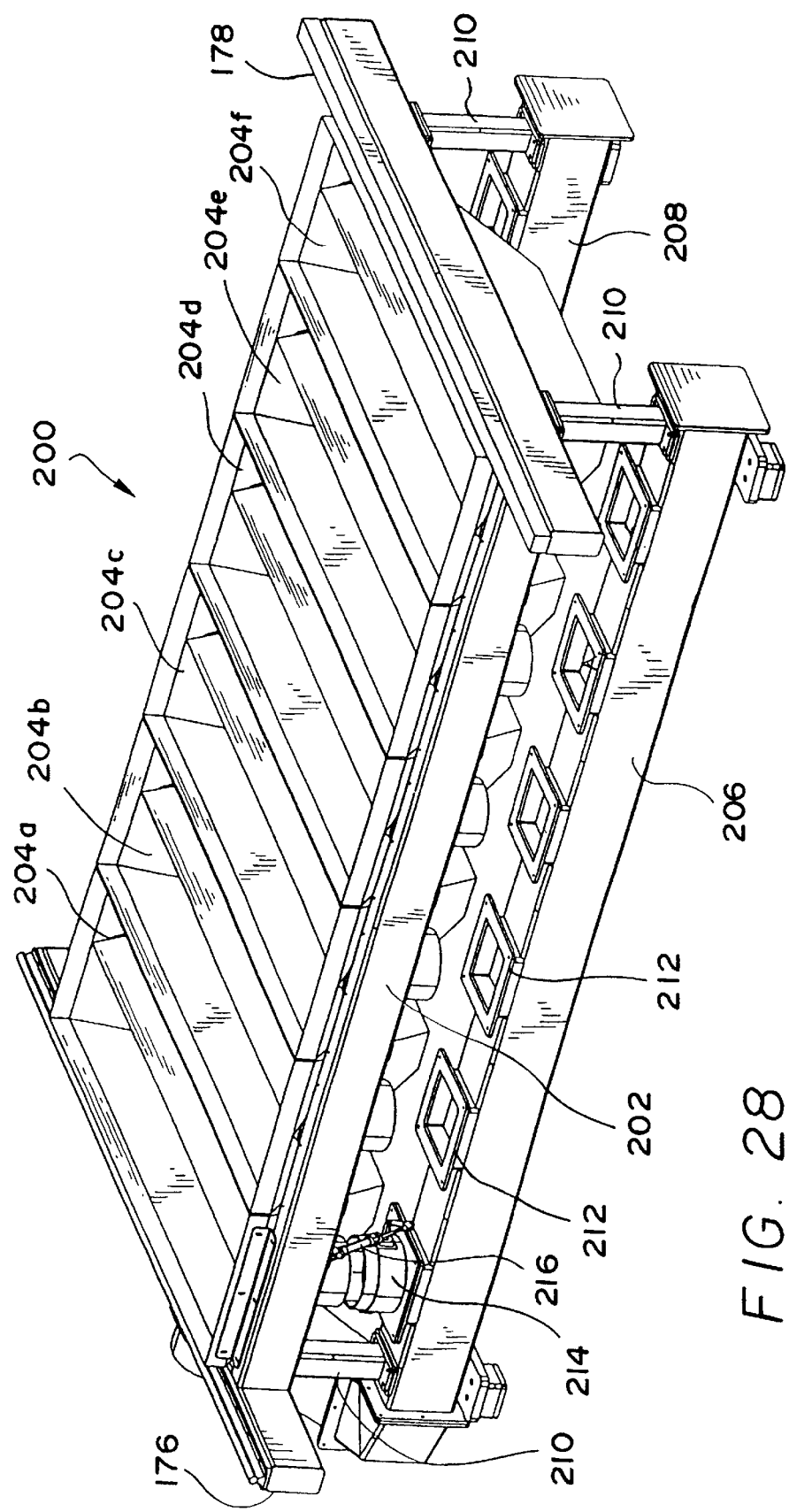
FIG. 28 is a perspective view of the base of the worktable of the instant invention laser cutting system that is adaptable to provide suction at the various portions of the cassette placed thereover.
Figure 29:
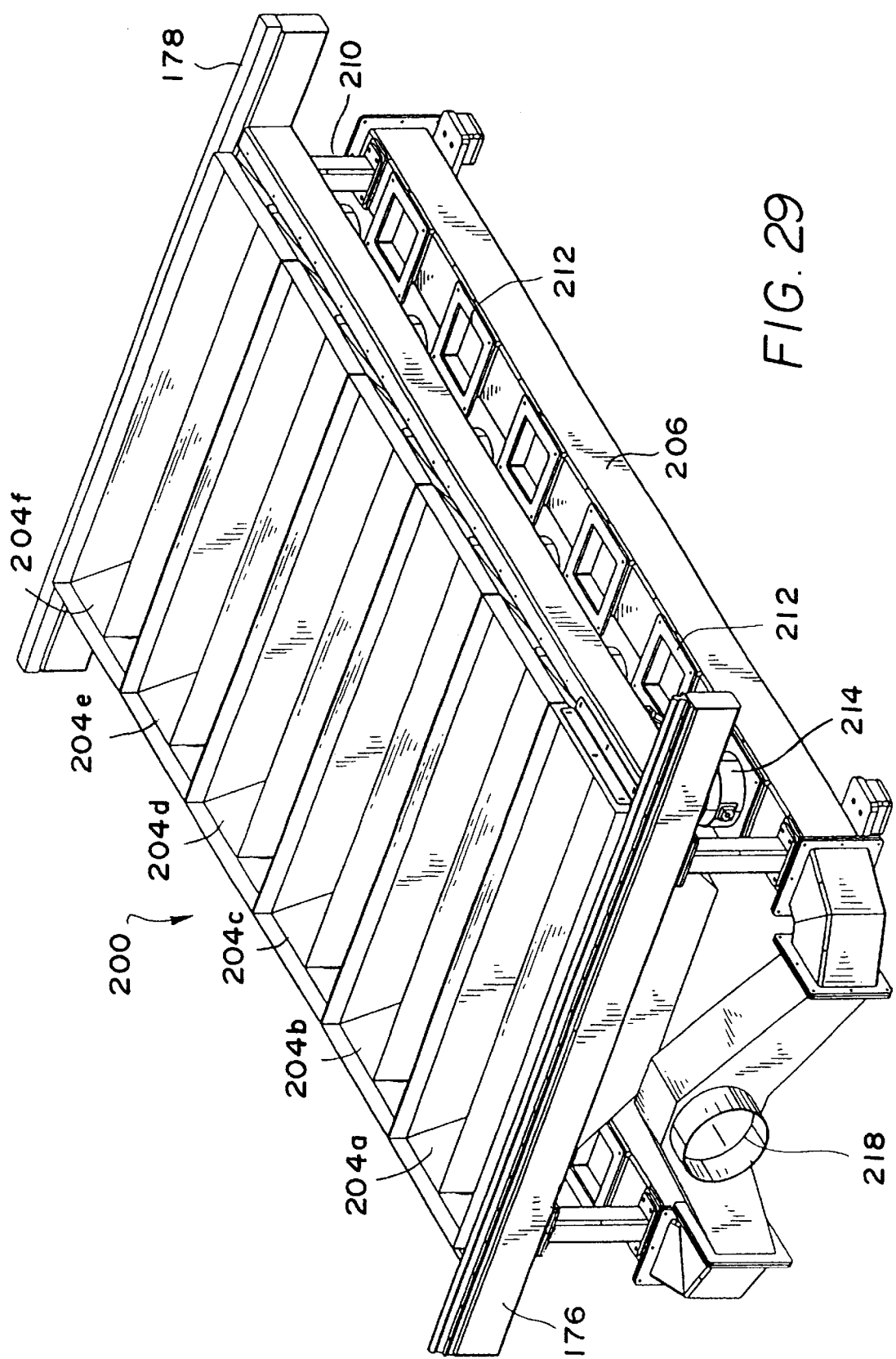
FIG. 29 is a second perspective view of the base shown in FIG. 28.

FIGS. 28 and 29 are respective perspective views of the base onto which worktable or cassette 60 is mounted. Base 200 is made of a platform 202 that is divided into a number of sections 204a–204f. Platform 202 in turn is mounted to two tubular chutes 206 and 208 by means of legs 210. Chutes 206 are hollow ventilation chutes that has a number of openings 212 formed therealong which are adaptable for receiving a tube 214 that connects the opening to an opening of a corresponding one of sections 204a–204f. Tubes 214, only one of which is shown for the sake of simplicity, is movable vertically by means of a corresponding hydraulic cylinder 216 for connection to its corresponding section. By providing vacuum in chute support 206, a vacuum is created at the appropriate sections 204 so as to suction the dust particles and/or exhaust gases or fluids that result from the piercing or cutting of the worksheet by the laser beam. The dust particles thus suctioned are collected and vented through chute output 218, which in turn is connected to vent 16 (FIGS. 1 and 2), so that the fall out dust particles are collected and removed from the work area of the laser cutting system. By synchronizing the cutting of the worksheet, the location of the worksheet where the cut is being effected, and the section of base 200 activated for suctioning, most, if not all, of the dust particles and waste gases from the laser beam cutting of the worksheet are removed.

Figure 30:
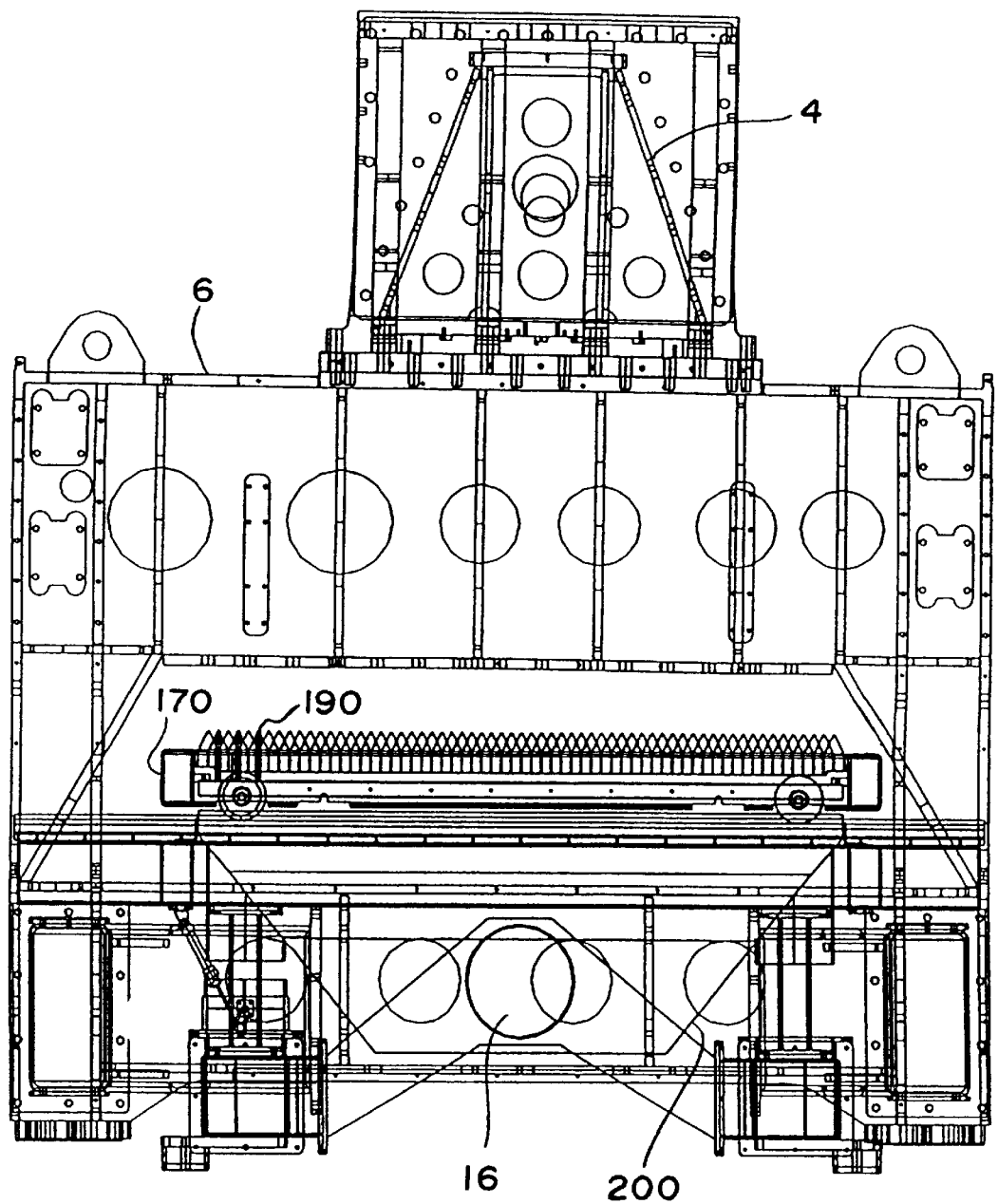
FIG. 30 is an end view of the laser cutting system of the instant invention with the cassette and the suction provided base all shown in relative relationship with the frame structure of FIGS. 1 and 2.

FIG. 30 is a cross-sectional view of the laser cutting system of the instant invention. In essence, it shows the relative positioning of the various components of the system by overlaying the frame structure with the worktable and the base to which the worktable is movably superposed.

Inasmuch as the present invention is subject to many variations, modifications and changes in detail, it is intended that all matters described throughout this specification and shown in the accompanying drawings be interpreted as illustrative only and not in a limiting sense. For example, even though the work processing apparatus described hereinabove relates to a laser cutter, it should be appreciated that other work processing apparatus such as for example a punch or a cutter may also utilize the frame structure of the present invention. Accordingly, it is intended that the invention be limited only by the spirit and scope of the hereto appended claims.

What is claimed is:

1. A laser cutter system, comprising:
    a laser beam outputting device movably positioned relative to a worksheet for outputting a laser beam to fabricate said worksheet, said device superposing over said worksheet;
    motor means for driving said device; and
    processing means for controlling said motor means for moving said device to locations over said worksheet for fabricating said worksheet, said processing means calculating the movements required for optimally moving said device between said locations by
        a) establishing a focal distance that varies in response to changes in the vertical distance separating said device and said worksheet between said device and said worksheet;
        b) determining the focal distance separating said device and said worksheet;
        c) determining the distance separating a location on said worksheet above which said device is and the next location on said worksheet above which said device is to be moved to;
        d) determining the optimal movement for said device to get from said location to said next location;
        e) using said optimal movement to move said device to said next location after said location is pierced by said laser beam output from said device; and
        f) repeating steps a to d until all locations to be pierced on said worksheet are pierced.

2. System of claim 1, further comprising:
    a work table whereon said worksheet is placed;
    wherein said processing means partitions the space on said work table whereon said worksheet is placed into a number of areas each having a set of parameters for compensating any irregularities peculiar to that area that could conceivably affect the optimal piercing of holes by said laser beam to the portion of said worksheet overlying that area.

3. System of claim 1, wherein said processing means, in calculating step d, further takes into consideration at least the distance separating said location and said next location and the focal distance from said device to said worksheet for effecting the optimal piercing of a hole in said worksheet by said laser beam.

4. System of claim 1, wherein said processing means, in calculating step d, further instructs said motor means to change the height said device superposes over said worksheet in accordance with the distance separating said location from said next location, and to vary the speed with which said device is moved from said location to said next location in proportion to the distance separating said device from said worksheet.

5. System of claim 2, wherein said processor means instructs said motor means to change the height of said device by increasing the height said device superposes over said worksheet, up to a maximum height, in response to the distance separating one location from an other location on said worksheet in, and to increase the speed of moving said device from said one location to said other location the higher said device superposes over said worksheet and/or the further said one location is from said other location.

6. System of claim 1, further comprising:
    a sensor provisioned to said device for continuously monitoring the vertical distance separating said device from said worksheet.

7. System of claim 1, wherein said processing means, in calculating step d, further interpolates the acceleration speed and the deceleration speed of said device by taking into consideration at least the path that separates one location from an other location and the vertical distance that separates said device from said worksheet.

8. System of claim 7, wherein said processing means further instructs said motor means to move said device by:
    accelerating said device away from said one location substantially immediately after the appropriately pierced cut has been effected at said one location on said worksheet;
    moving said device in a vertical direction to an optimal height away from said worksheet if it is determined that said other location is of sufficient distance away from said one location to warrant the moving of said device to said height;
    decelerating the speed of said device before said device reaches said other location so that said device substantially reaches said other location at the end of its deceleration; and
    outputting said laser beam to pierce said worksheet as soon as said device reaches said other location.

9. System of claim 1, wherein said processing means further controls the outputting of said laser beam substantially at the same time that said device has stopped at said next location.

10. System of claim 1, wherein said processing means further deactivates said laser beam at substantially the same time or just prior to the movement of said device to said next location.

11. A laser cutter system for fabricating a worksheet having different to be fabricated locations, comprising:
    a) a laser beam outputting device superposed over and movably positioned relative to said worksheet for outputting a laser beam to fabricate said worksheet;
    b) motor means for driving said device;
    c) means for determining the focal distance separating said device and said worksheet;
    d) means for determining the distance separating a location on said worksheet above which said device is and the next location on said worksheet above which said device is to be moved to;
    e) means for determining the optimal movement for said device to get from said location to said next location; and f) means for providing the determined optimal movement to said motor means to drive said device to said next location after said location is pierced by said laser beam output from said device.

12. System of claim 11, wherein until all locations to be pierced on said worksheet are pierced, said c–f means will continue to calculate the movements required for optimally moving said device to each of said locations from the previous location.

13. System of claim 11, further comprising:

a work table whereon said sheet is placed;

wherein the space on said work table whereon said worksheet is placed is partitioned into a number of areas each having a set of parameters for compensating any irregularities peculiar to that area that could conceivably affect the optimal piercing of holes by said laser beam to the portion of said worksheet overlying that area.

14. System of claim 11, wherein said motor means, upon receiving instructions from said f means, move said device by:

accelerating said device away from said one location substantially immediately after the appropriately pierced cut has been effected at said one location on said worksheet;

moving said device in a vertical direction to an optimal height away from said worksheet if it is determined that said other location is of sufficient distance away from said one location to warrant the moving of said device to said height;

decelerating the speed of said device before said device reaches said other location so that said device substantially reaches said other location at the end of its deceleration; and outputting said laser beam to pierce said worksheet as soon as said device reaches said other location.

15. A laser system for fabricating a worksheet having different to be fabricated locations, comprising:

a laser beam outputting device superposed over and movably positioned relative to said worksheet for outputting a laser beam to fabricate said worksheet;

at least one motor for driving said device; and a processor a) determining the focal distance separating said device and said worksheet, b) determining the distance separating a location on said worksheet above which said device is and the next location on said worksheet above which said device is to be moved to, c) determining the optimal movement for said device to get from said location to said next location, and d) providing the determined optimal movement to said motor to drive said device to said next location after said location is pierced by said laser beam output from said device.

16. System of claim 15, further comprising:

a laser generator for providing said laser beam to said device; and means working cooperatively with said laser generator for focusing said laser beam.

17. System of claim 15, further comprising:

a work table whereon said worksheet is placed;

wherein the space on said work table whereon said worksheet is placed is partitioned into a number of areas each having a set of parameters for compensating any irregularities peculiar to that area that could conceivably affect the optimal piercing of holes by said laser beam to the portion of said worksheet overlying that area.

18. System of claim 15, wherein said processor further instructs said motor to move said device by:

accelerating said device away from said one location substantially immediately after the appropriately pierced cut has been effected at said one location on said worksheet;

moving said device in a vertical direction to an optimal height away from said worksheet if it is determined that said other location is of sufficient distance away from said one location to warrant the moving of said device to said height;

decelerating the speed of said device before said device reaches said other location so that said device substantially reaches said other location at the end of its deceleration; and outputting said laser beam to pierce said worksheet as soon as said device reaches said other location.

* * * * *